US008949734B2

(12) United States Patent
Stallings et al.

(10) Patent No.: US 8,949,734 B2
(45) Date of Patent: Feb. 3, 2015

(54) MOBILE DEVICE COLOR-BASED CONTENT MAPPING AND NAVIGATION

(75) Inventors: Heath Stallings, Colleyville, TX (US); Sok Y. Hwang, Dallas, TX (US); Shadman Zafar, Plano, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 970 days.

(21) Appl. No.: 12/651,572

(22) Filed: Jan. 4, 2010

(65) Prior Publication Data
US 2011/0167380 A1 Jul. 7, 2011

(51) Int. Cl.
*G06F 3/048* (2013.01)
*G06F 3/0488* (2013.01)
*G06F 3/0482* (2013.01)
*G06F 3/0485* (2013.01)
*G06F 9/44* (2006.01)

(52) U.S. Cl.
CPC ............ *G06F 3/0488* (2013.01); *G06F 3/0482* (2013.01); *G06F 3/0485* (2013.01); *G06F 9/4443* (2013.01)
USPC ....................................................... 715/784

(58) Field of Classification Search
CPC .................................................. G06F 3/0482
USPC ....................................................... 715/784
See application file for complete search history.

(56) References Cited

U.S. PATENT DOCUMENTS

| 6,556,212 | B1* | 4/2003 | Griffin | 345/593 |
|---|---|---|---|---|
| 7,355,606 | B2* | 4/2008 | Paquette | 345/589 |
| 8,085,276 | B2* | 12/2011 | Voliter et al. | 345/589 |
| 2008/0204268 | A1* | 8/2008 | Dowling et al. | 340/815.45 |
| 2009/0021525 | A1* | 1/2009 | Chuang et al. | 345/593 |
| 2009/0058872 | A1* | 3/2009 | Boettcher et al. | 345/589 |
| 2009/0106676 | A1* | 4/2009 | Brezina et al. | 715/763 |

OTHER PUBLICATIONS

Kopplin, "Use Direct3D 8 to Fly Through the Munsell Color Solid" Jul. 19, 2004 Article. http://www.codeproject.com/Articles/7751/Use-Direct3D-8-To-Fly-Through-the-Munsell-Color-So.*
Co-pending U.S. Appl. No. 12/341,500 entitled "Stage Interaction for Mobile Device" by Heath Stallings et al., filed Dec. 22, 2008, 40 pages.

* cited by examiner

*Primary Examiner* — Sara England

(57) ABSTRACT

A mobile device associates a distinct background color with each graphical window of a sequence of graphical windows, and displays, on a touch-sensitive display, a first graphical window from the sequence of graphical windows, where the first graphical window includes a first background color and one or more display elements. The mobile device also receives a user input to the touch-sensitive display, scrolls through the sequence of graphical windows based on the user input, and displays, on the touch-sensitive display, a second graphical window from the sequence of graphical windows based on the scrolling, where the second graphical window includes a second background color different than the first background color.

25 Claims, 21 Drawing Sheets

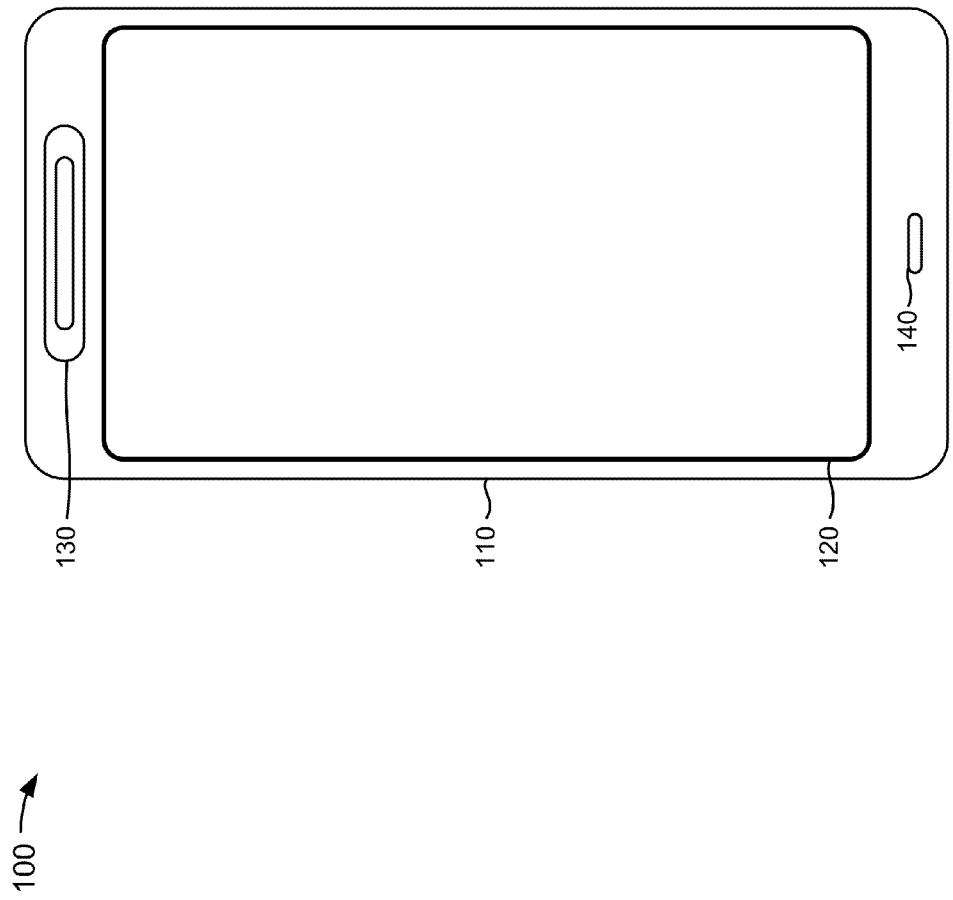

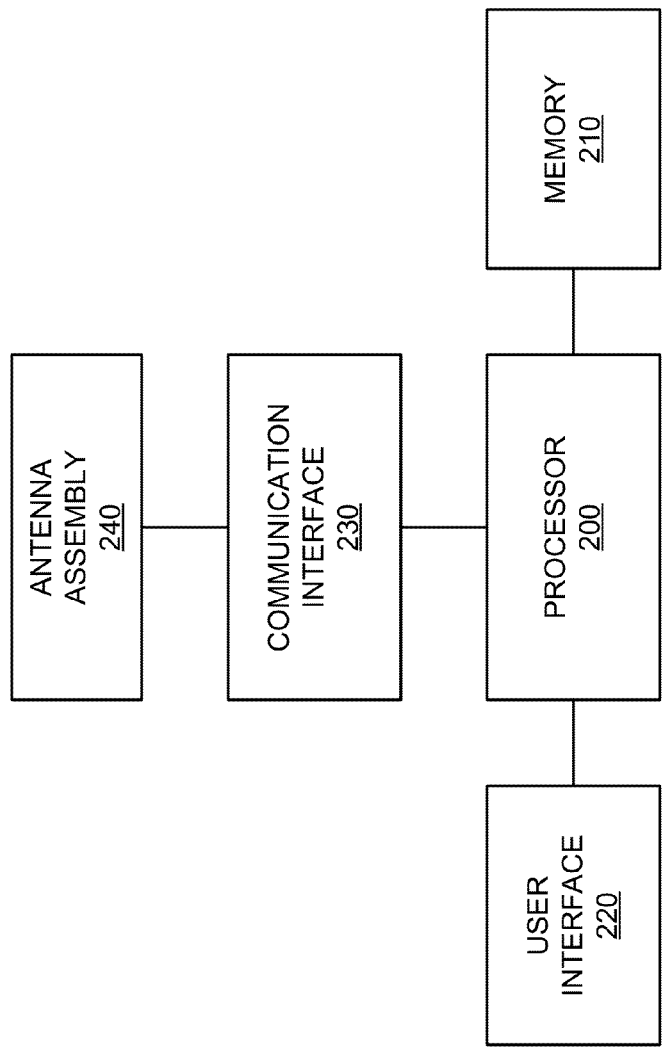

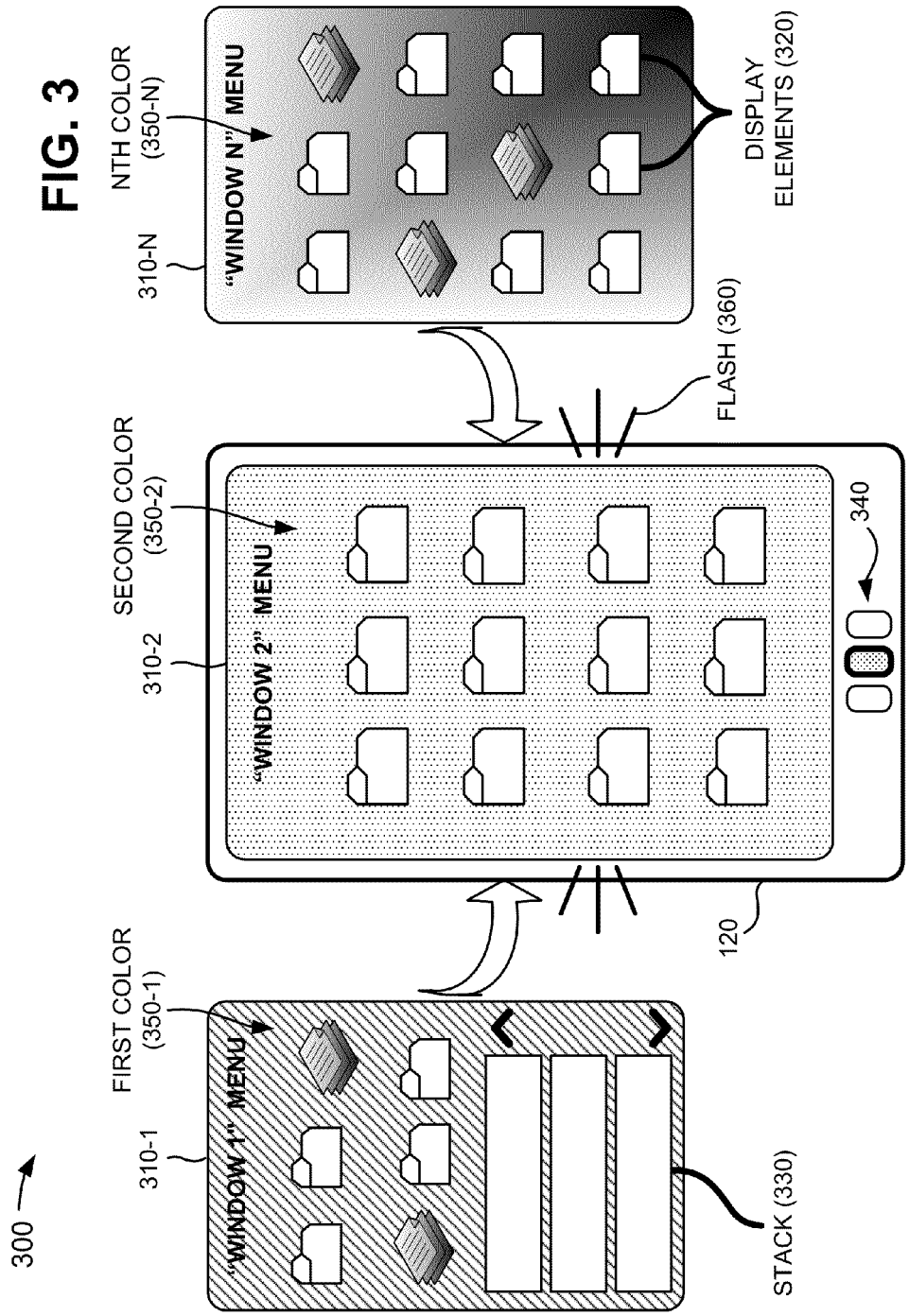

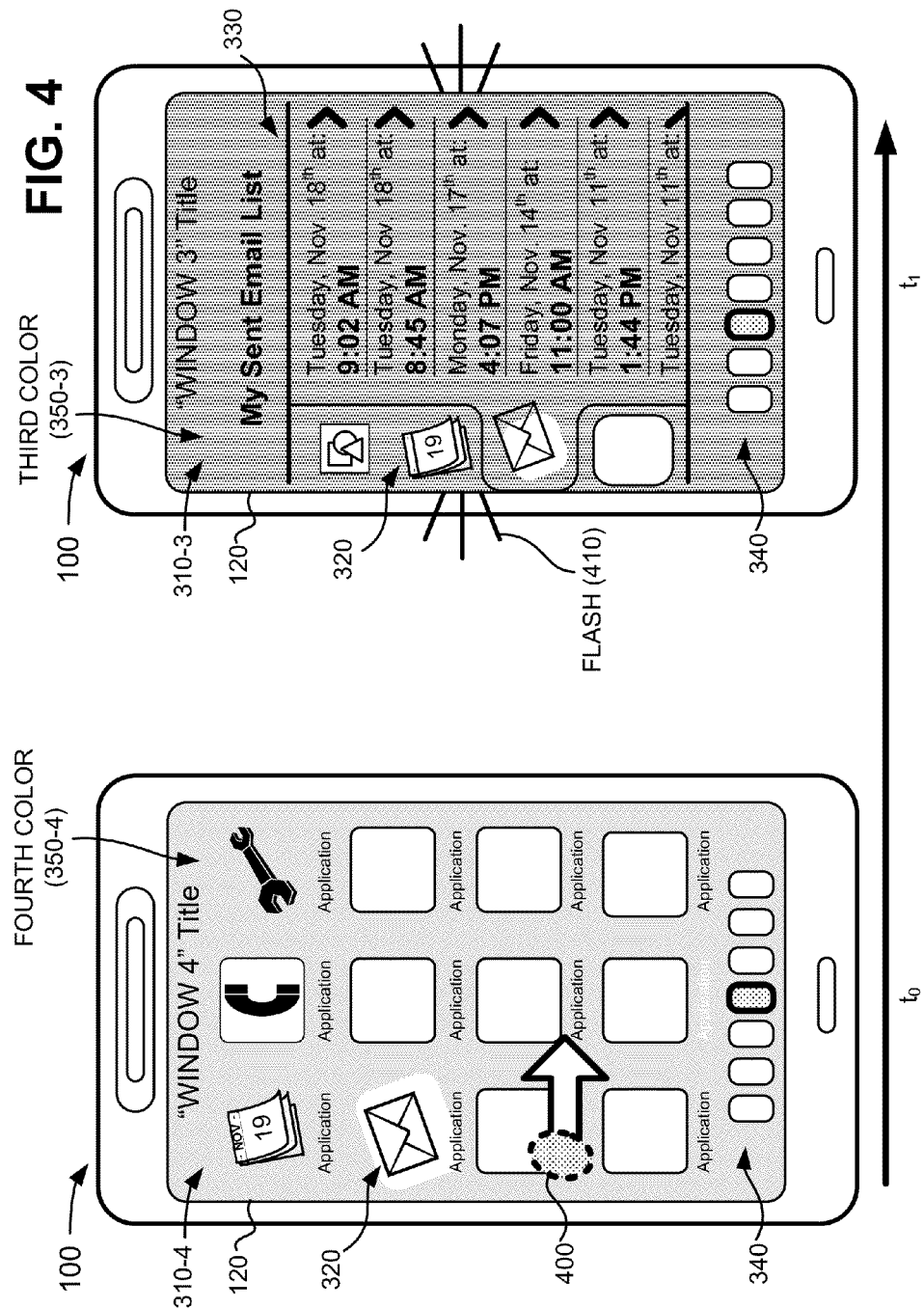

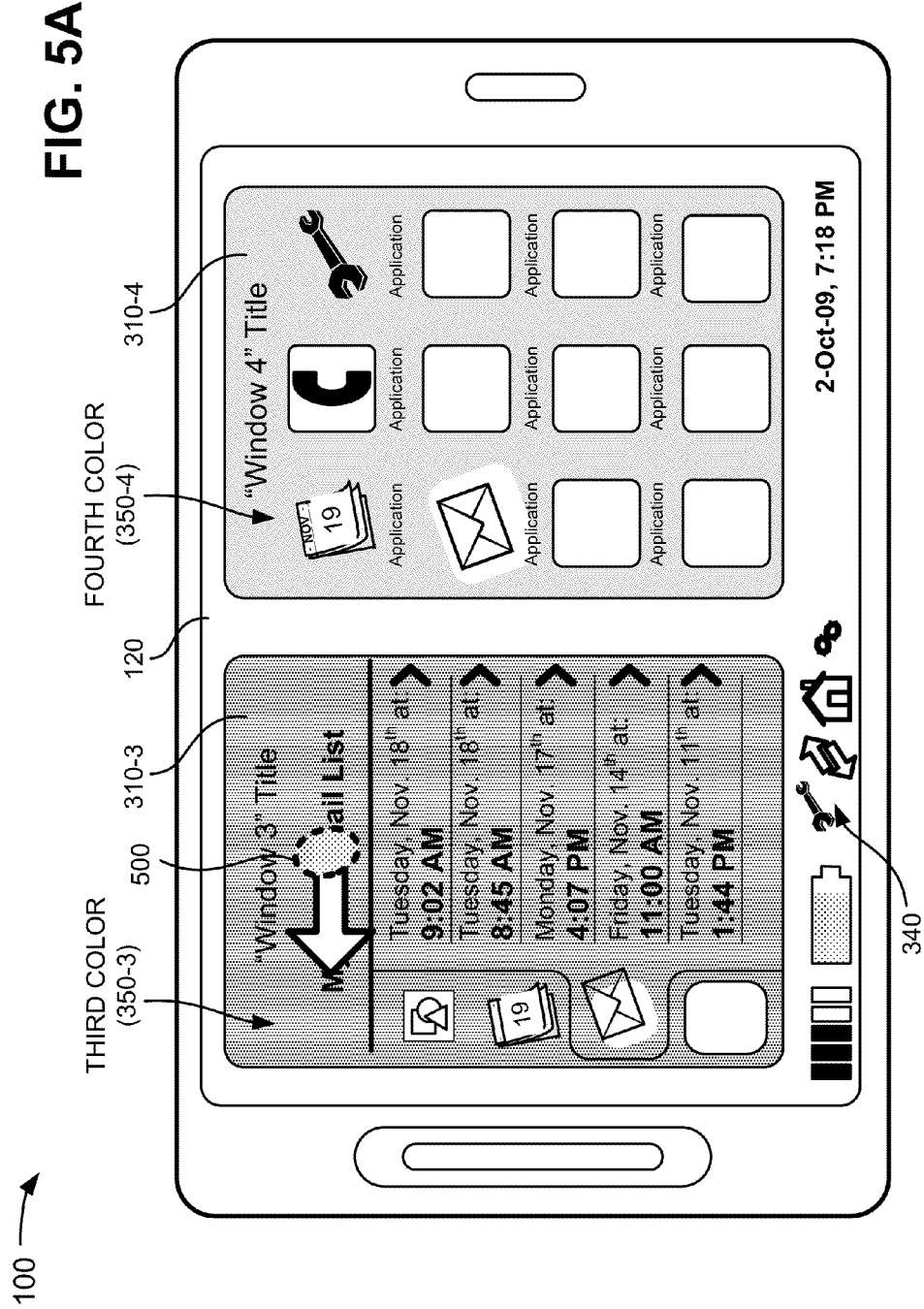

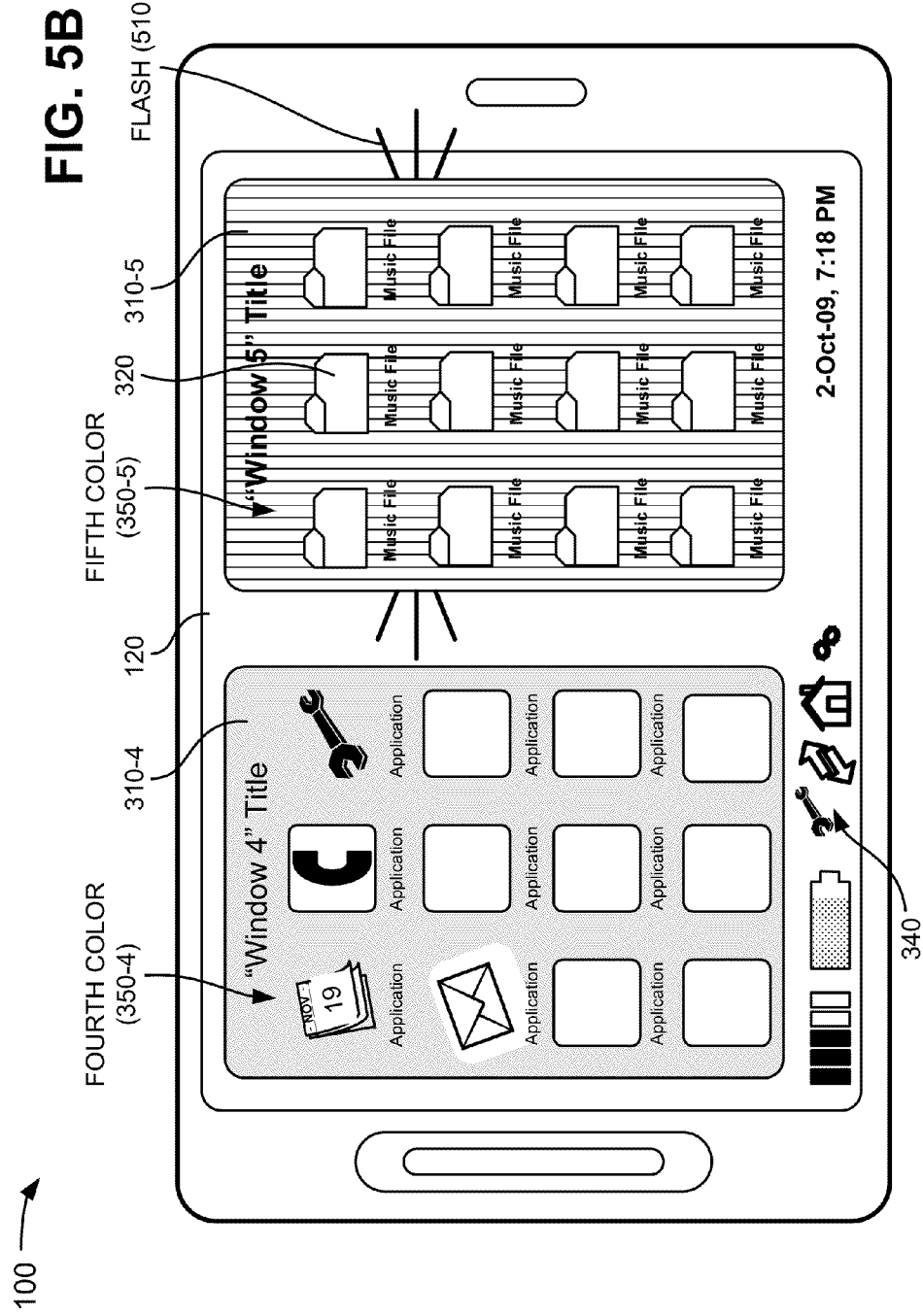

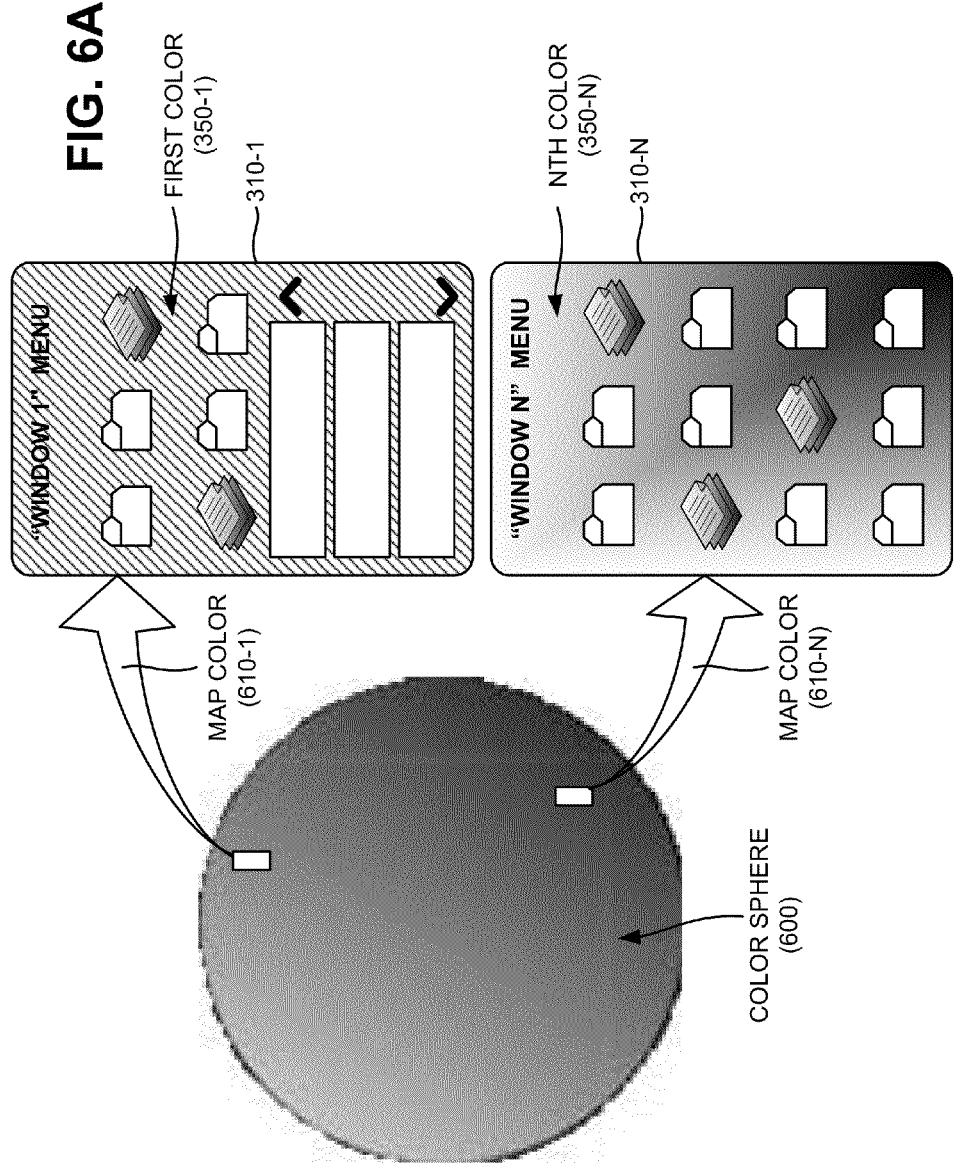

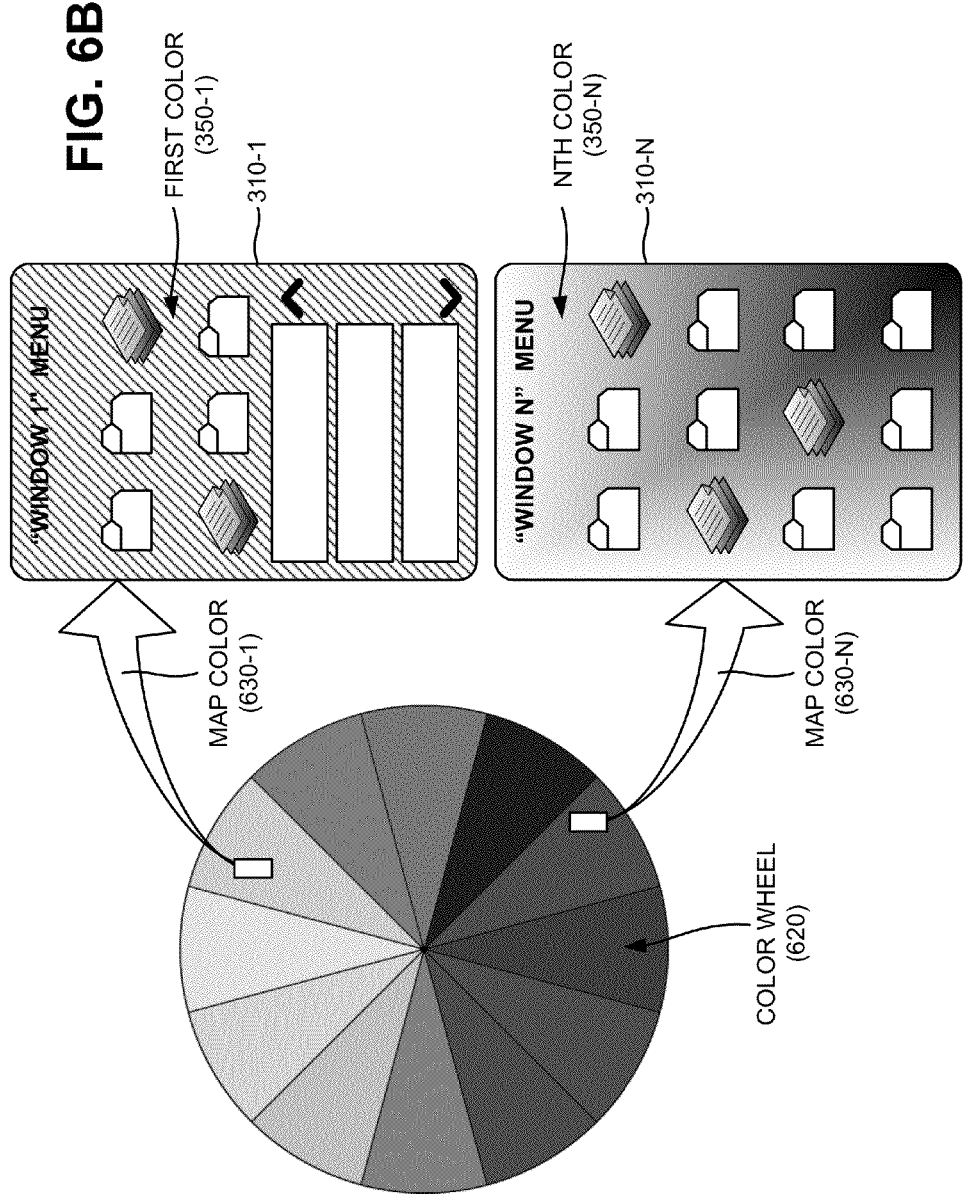

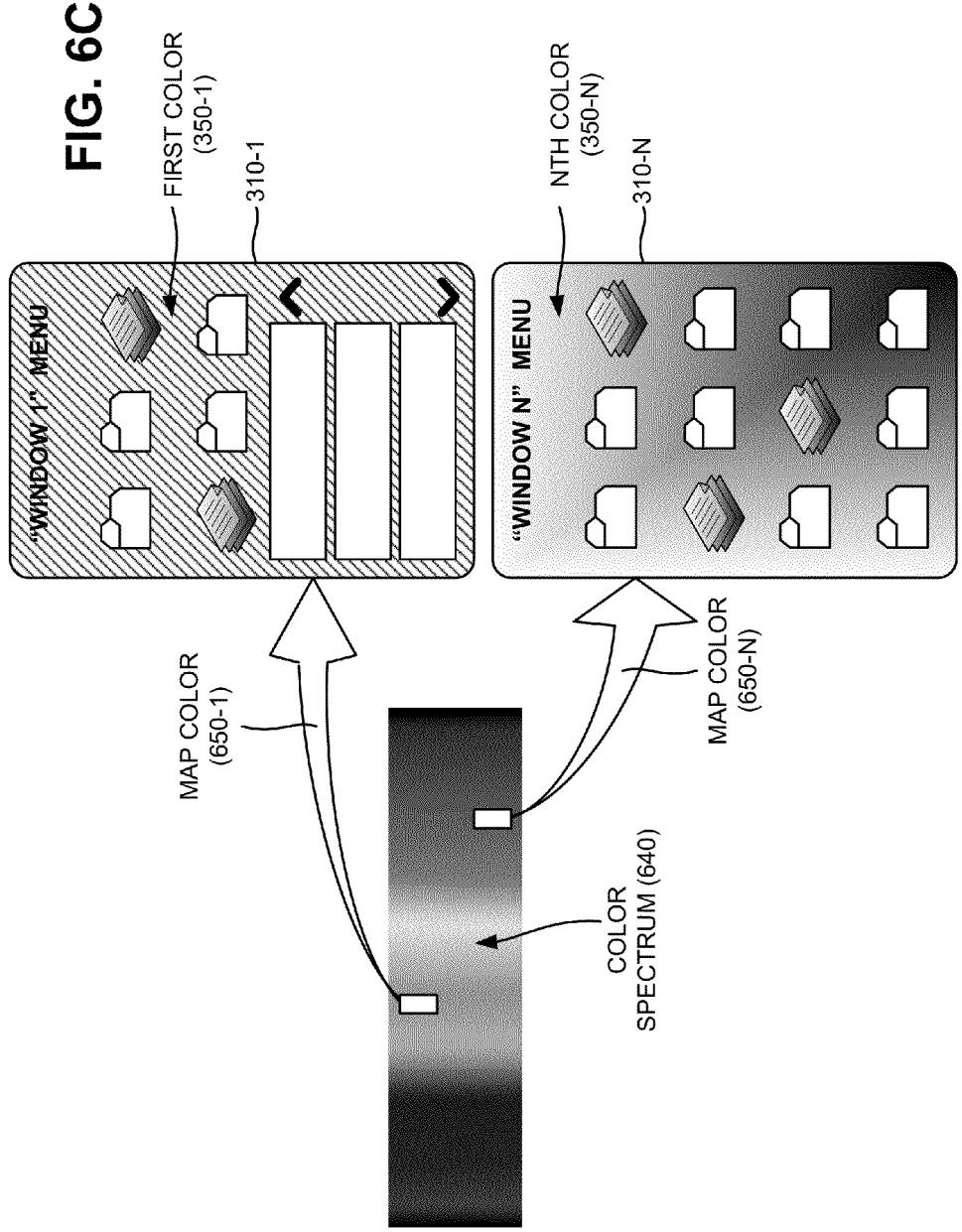

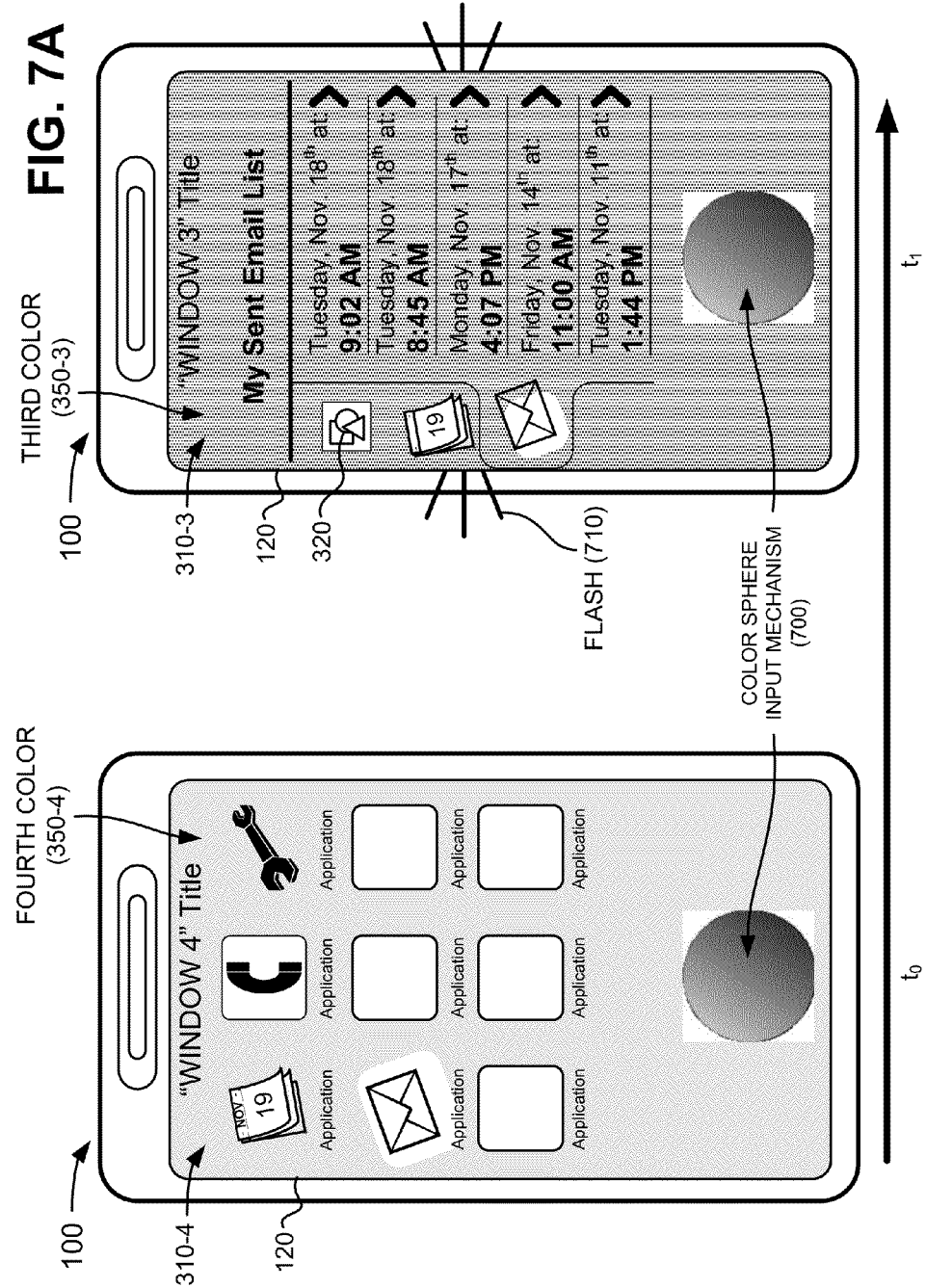

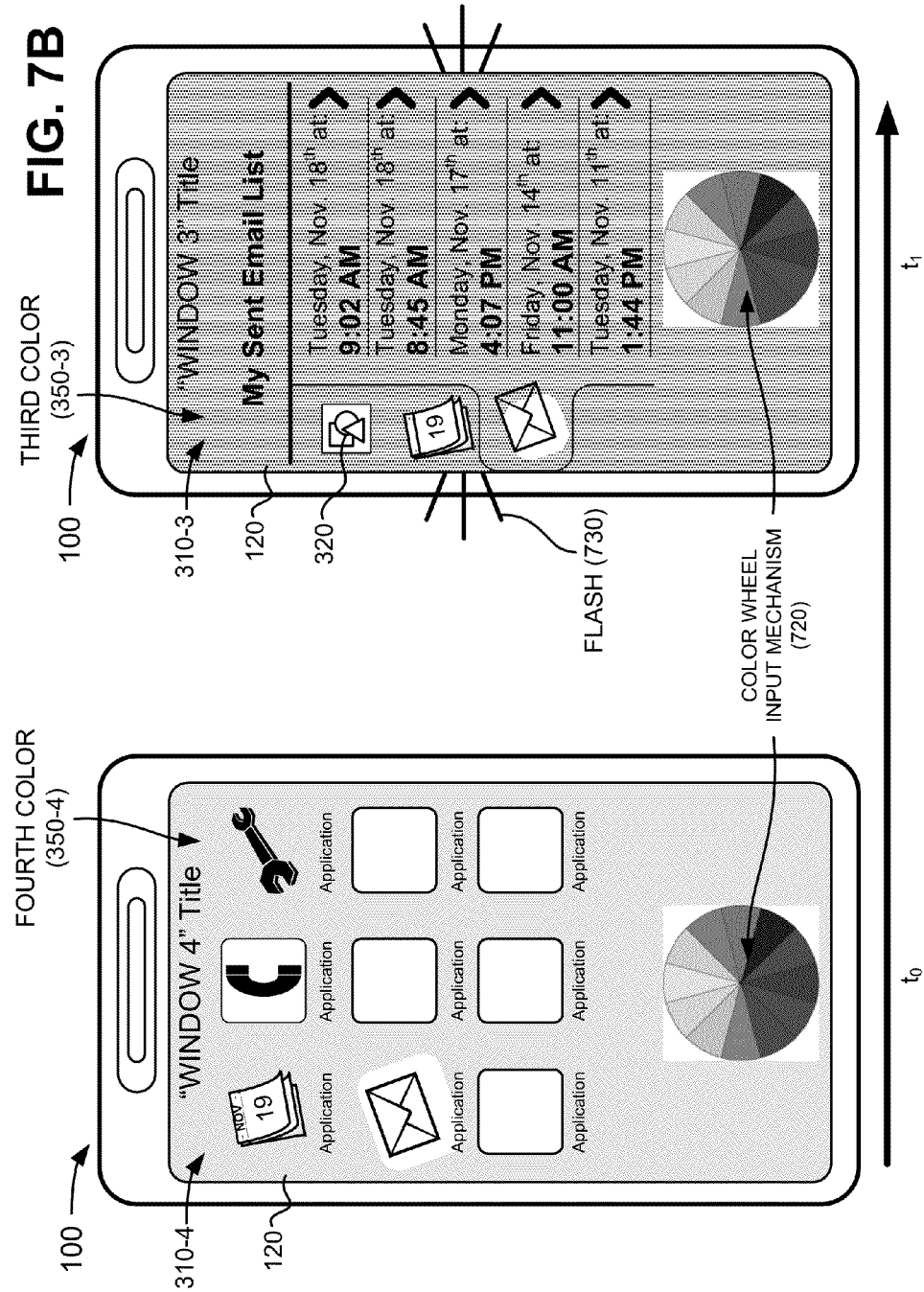

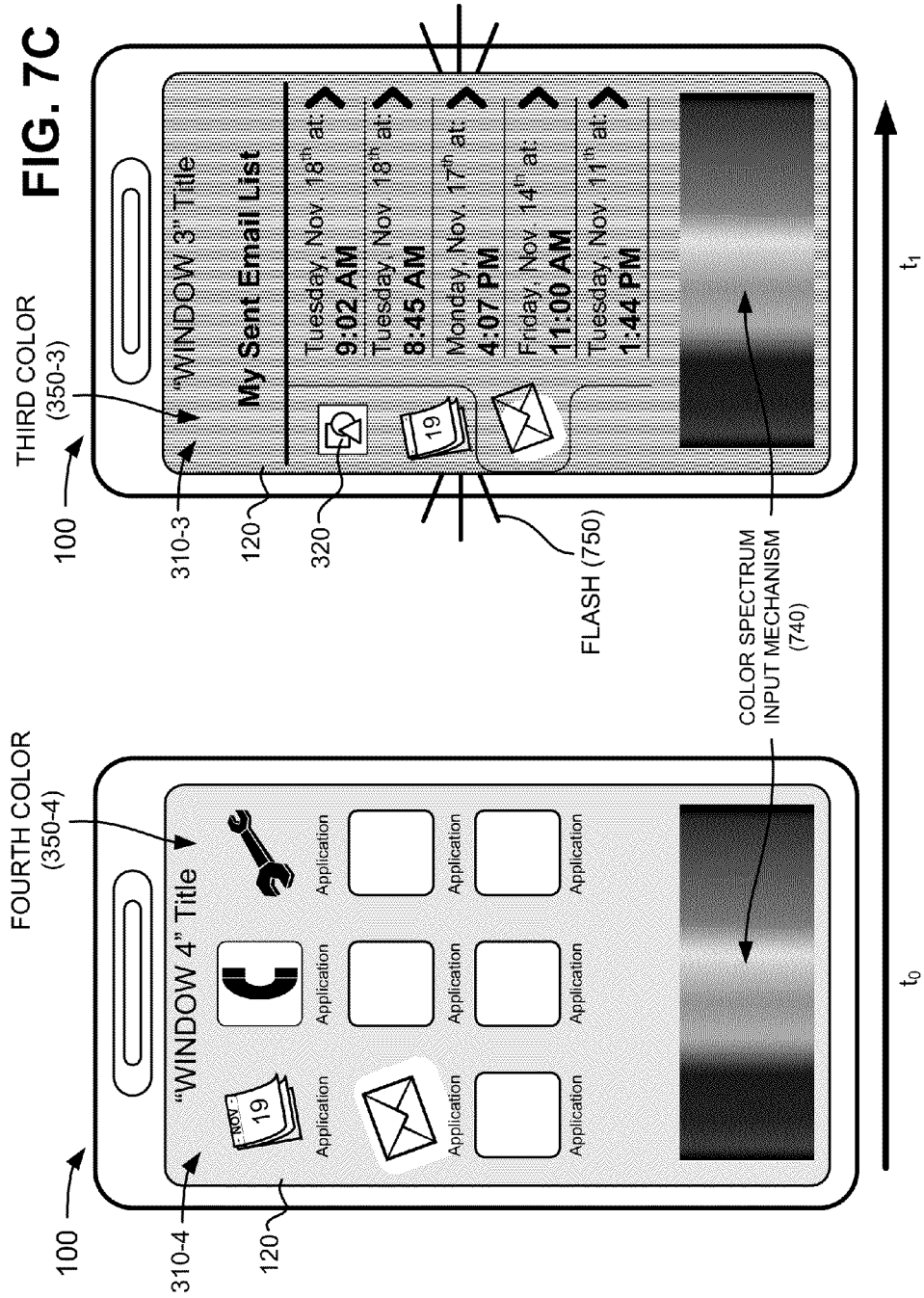

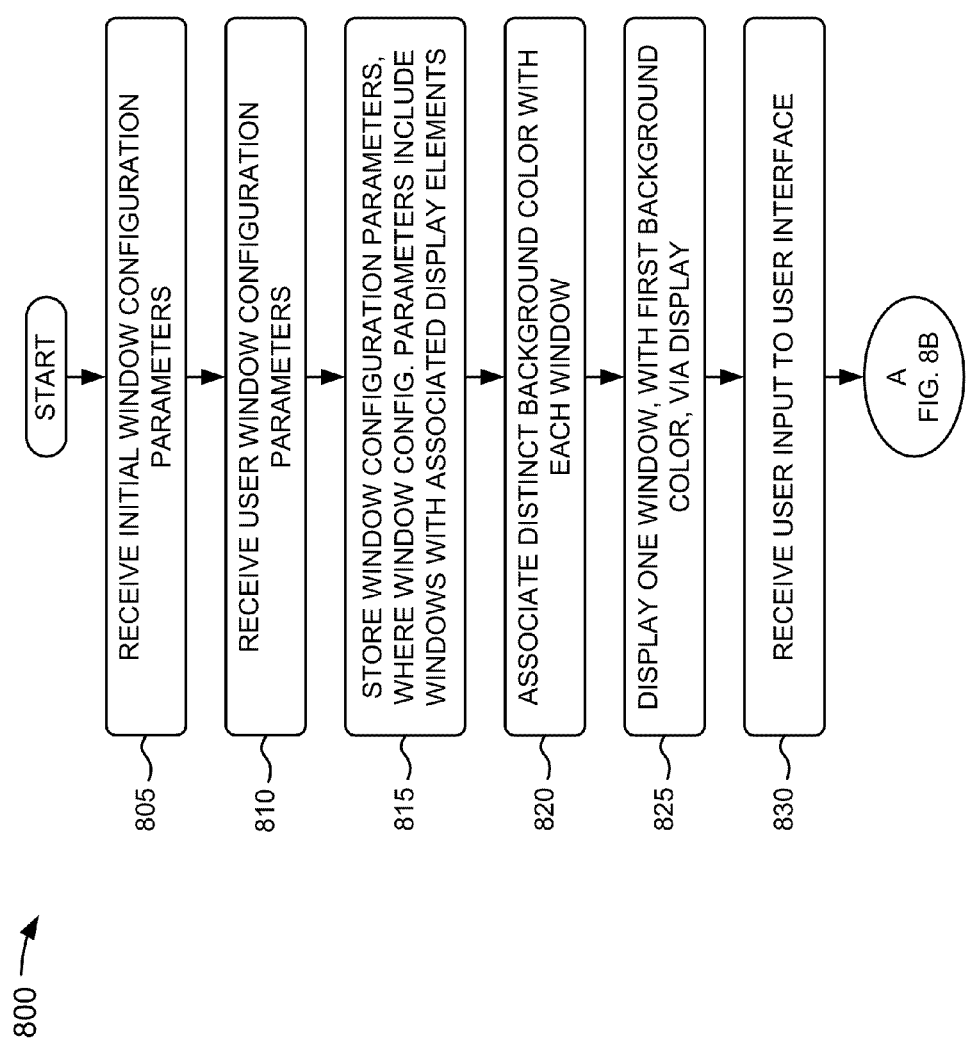

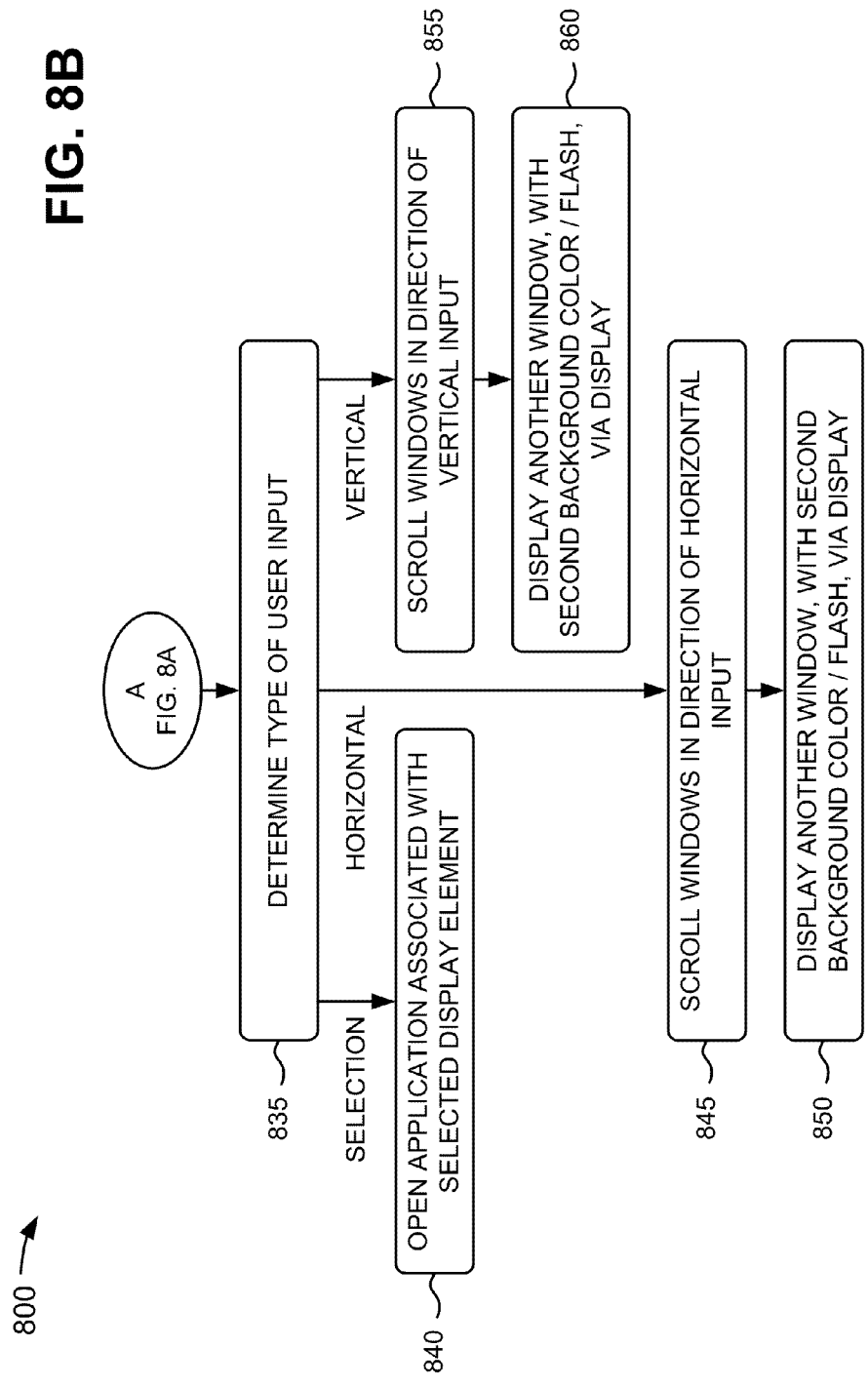

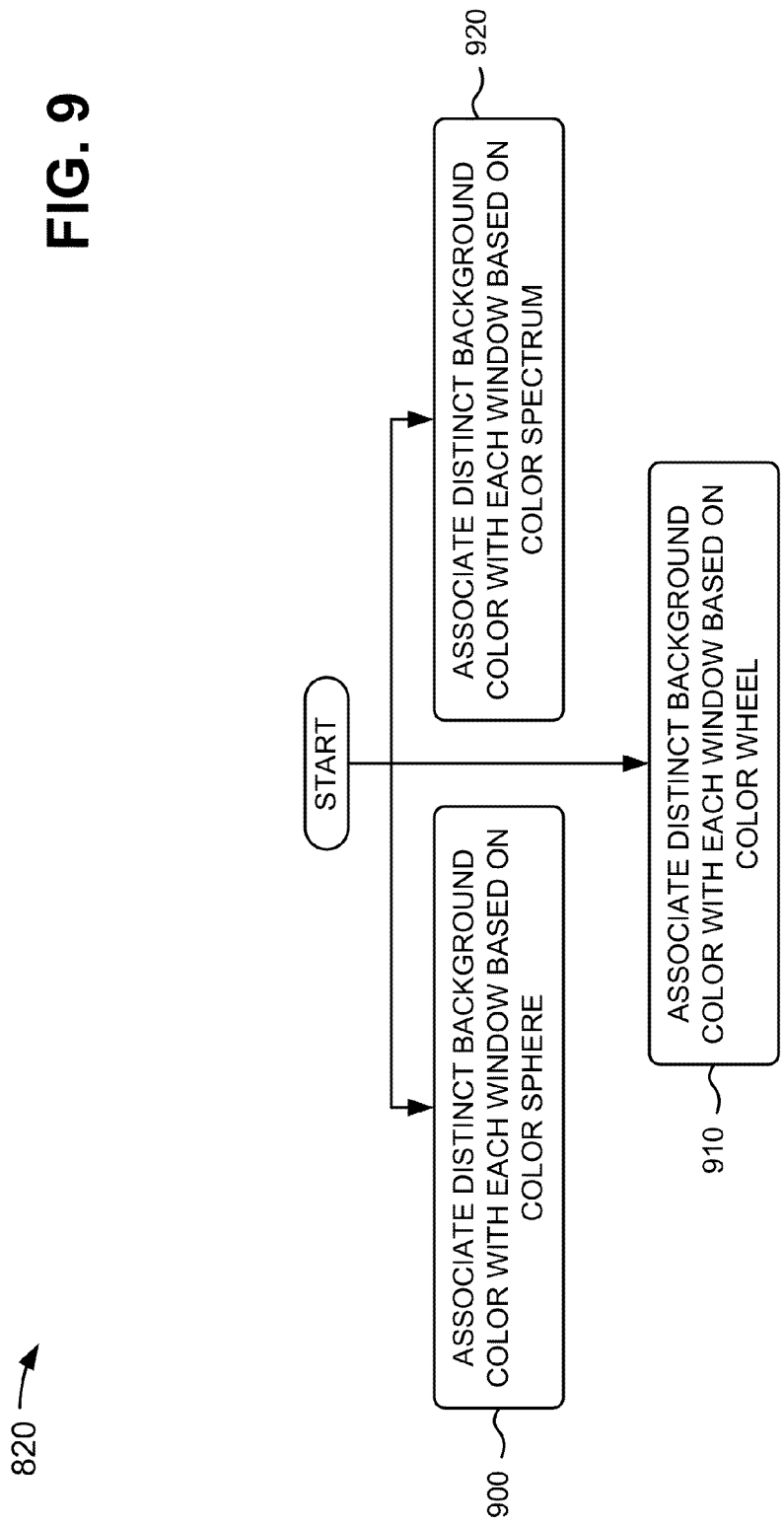

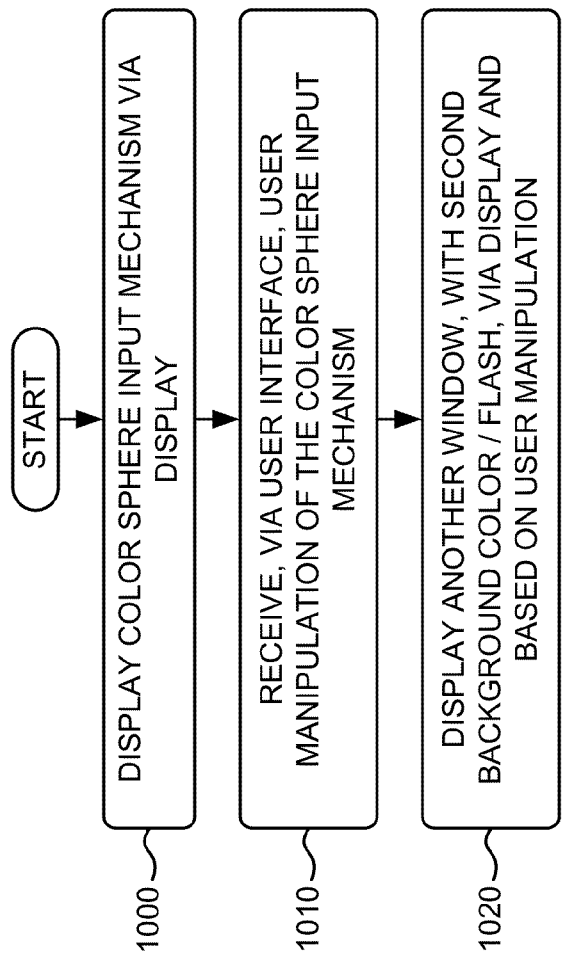

MOBILE DEVICE COLOR-BASED CONTENT MAPPING AND NAVIGATION

BACKGROUND

Mobile devices (e.g., cell phones, personal digital assistants (PDAs), etc.) can be configured to use an increasing amount and variety of applications. For example, a mobile device may use content, such as telephone applications, organizers, email applications, instant messaging (IM) applications, games, cameras, image viewers, image files, video files, music files, word processing files, other content, etc. Mobile device users typically launch an application by selecting an icon (or shortcut) to activate the application. Despite the large number of options, such users still desire to find and select a desired icon quickly. However, the available display (e.g., user interface) sizes of many mobile devices may limit the number of icons that can be effectively presented to the users. Existing user interfaces may provide one of a variety of menu formats that group menu items into categories and sub-categories. These user interfaces may require a user to "drill down" through multiple menus to select a desired icon or other item.

BRIEF DESCRIPTION OF THE DRAWINGS

FIG. 1 depicts a diagram of an exemplary device in which systems and/or methods described herein may be implemented;

FIG. 2 illustrates a diagram of exemplary components of the device depicted in FIG. 1;

FIG. 3 depicts a diagram of an exemplary implementation of a user interface capable of being provided by the device illustrated in FIG. 1;

FIG. 4 illustrates a diagram of exemplary sliding window and color-based content navigation operations capable of being performed by the device depicted in FIG. 1;

FIGS. 5A and 5B depict diagrams of exemplary sliding window and color-based content navigation operations capable of being performed by the device illustrated in FIG. 1, when the device is provided in a different orientation;

FIGS. 6A-6C illustrate diagrams of exemplary window color mappings capable of being performed by the device depicted in FIG. 1;

FIGS. 7A-7C depict diagrams of exemplary color-based input mechanisms for performing navigation operations capable of being performed by the device illustrated in FIG. 1;

FIGS. 8A-12 illustrate flow charts of an exemplary process for color-based content mapping and navigation according to implementations described herein;

DETAILED DESCRIPTION OF PREFERRED EMBODIMENTS

Figure 11:
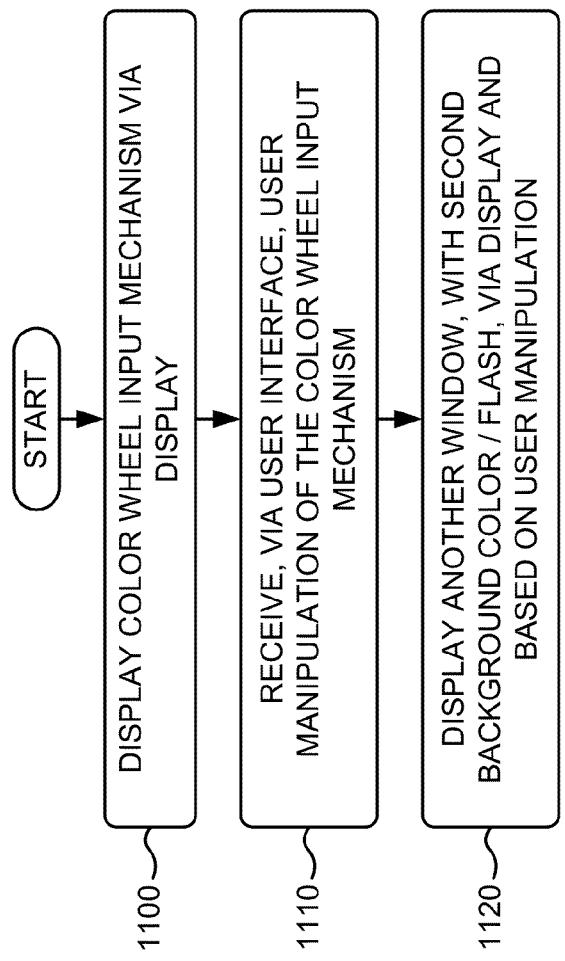

The following detailed description refers to the accompanying drawings. The same reference numbers in different drawings may identify the same or similar elements. Also, the following detailed description does not limit the invention.

Systems and/or methods described herein may provide color-coded panels or backgrounds for multiple windows capable of being presented on a display of a mobile device (e.g., a cell phone, a PDA, etc.). Each window may present display elements (e.g., keys, icons, buttons, thumbnails, links, etc.) that may be related to each other but may be unrelated to the other windows. For example, one window may include a unique group of application icons, while another window may include different icons for particular applications. The systems and/or methods may enable a user of the mobile device to navigate the groups of windows based on color (e.g., via a color-based input mechanism). The systems and/or methods may provide a flash of color (or some other color-based visual stimulus) to the user to indicate a transition from one window (e.g., that includes a group of related display elements) to another window (e.g., that includes a different group of related display elements). The user may visually sense the color-based input mechanism and/or the flash during navigation of the multiple windows. Thus, the systems and/or methods may provide a user interface that may be navigated with few gestures/keystrokes and may minimize the need to "drill down" through multiple menus.

In one implementation, for example, the systems and/or methods may receive initial window configuration parameters and user-defined window configuration parameters for a mobile device, and may store the initial/user-defined window configuration parameters (e.g., which may include an arrangement of multiple windows with associated display elements). The systems and/or methods may associate a distinct background color with each window of the multiples windows, may display one window (e.g., with a first background color) via a display (e.g., a touch screen) associated with the mobile device, and may receive a user input to a user interface associated with the mobile device. The systems and/or methods may determine the type of user input, and, if the user input includes selection of a display element, may open an application associated with the selected display element. If the user input includes a horizontal touch gesture on the user interface, the systems and/or methods may scroll the multiple windows in a direction of the horizontal touch gesture and may display another window (e.g., with a second background color) with a flash of color via the display. If the user input includes a vertical touch gesture on the user interface, the systems and/or methods may scroll the multiple windows in a direction of the vertical touch gesture and may display another window (e.g., with a second background color) with a flash of color via the display.

As used herein, the term "user" is intended to be broadly interpreted to include a mobile device or a user of a mobile device. The term "touch screen," as used herein, is intended to be broadly interpreted to include a touch screen display, a touch sensitive input device, a touch sensitive interface, a touch sensitive screen, etc.

FIG. 1 depicts a diagram of an exemplary mobile device 100 (hereinafter referred to as "device 100") in which systems and/or methods described herein may be implemented. Device 100 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a portable gaming system, a global positioning system (GPS) device, a printer, a facsimile machine, a pager, a camera (e.g., a contemporary camera or a digital camera), a video camera (e.g., a camcorder), a calculator, binoculars, a telescope, a personal computer, a laptop computer, and any other device or mobile device capable of receiving user input to a display. As illustrated in FIG. 1, device 100 may include a housing 110, a display 120, a speaker 130, and/or a microphone 140.

Housing 110 may protect the components of device 100 from outside elements. Housing 110 may include a structure configured to hold devices and components used in device 100, and may be formed in a variety of materials. For example, housing 110 may be formed from plastic, metal, or a composite, and may be configured to support display 120, speaker 130, and/or microphone 140.

Display 120 may provide visual information to the user. For example, display 120 may display text input into device 100, text, images, video, and/or graphics received from another device, and/or information regarding incoming or outgoing calls or text messages, emails, media, games, phone books, address books, the current time, etc. In one implementation, display 120 may include a touch screen display that may be configured to receive a user input when the user touches display 120. For example, the user may provide an input to display 120 directly, such as via the user's finger, or via other input objects, such as a stylus. User inputs received via display 120 may be processed by components and/or devices operating in device 100. The touch screen display may permit the user to interact with device 100 in order to cause device 100 to perform one or more operations described herein. Exemplary technologies to implement a touch screen on display 120 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 120 to be used as an input device. The touch-screen-enabled display 120 may also identify movement of a body part or a pointing device as it moves on or near the surface of the touch-screen-enabled display 120.

Alternatively, or additionally, the touch screen display functionality described herein may be provided via control buttons (e.g., that permit a user to interact with device 100) and/or a keypad (e.g., a standard telephone keypad). For example, display 120 may be controlled via selection of an "OK" control button (or a similar soft key), and may be navigated using arrow keys, a touch pad, etc. Selection of the "OK" control button again may enable an object provided on display 120 to be highlighted.

Speaker 130 may provide audible information to a user of device 100. Speaker 130 may be located in an upper portion of device 100, and may function as an ear piece when a user is engaged in a communication session using device 100. Speaker 130 may also function as an output device for music and/or audio information associated with games and/or video images played on device 100.

Microphone 140 may receive audible information from the user. Microphone 140 may include a device that converts speech or other acoustic signals into electrical signals for use by device 100. Microphone 140 may be located proximate to a lower side of device 100.

Although FIG. 1 shows exemplary components of device 100, in other implementations, device 100 may contain fewer, different, differently arranged, or additional components than depicted in FIG. 1. In still other implementations, one or more components of device 100 may perform one or more other tasks described as being performed by one or more other components of device 100.

FIG. 2 illustrates a diagram of exemplary components of device 100. As illustrated, device 100 may include a processor 200, memory 210, a user interface 220, a communication interface 230, and/or an antenna assembly 240.

Processor 200 may include one or more microprocessors, application-specific integrated circuits (ASICs), field-programmable gate arrays (FPGAs), or the like. Processor 200 may control operation of device 100 and its components. In one implementation, processor 200 may control operation of components of device 100 in a manner described herein.

Memory 210 may include a random access memory (RAM), a read-only memory (ROM), and/or another type of memory to store data and instructions that may be used by processor 200.

User interface 220 may include mechanisms for inputting information to device 100 and/or for outputting information from device 100. Examples of input and output mechanisms might include buttons (e.g., control buttons, keys of a keypad, a joystick, etc.) or a touch screen interface (e.g., display 120) to permit data and control commands to be input into device 100; a speaker (e.g., speaker 130) to receive electrical signals and output audio signals; a microphone (e.g., microphone 140) to receive audio signals and output electrical signals; a display (e.g., display 120) to output visual information (e.g., text input into device 100); a vibrator to cause device 100 to vibrate; etc.

Communication interface 230 may include, for example, a transmitter that may convert baseband signals from processor 200 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive RF signals over the air. Antenna assembly 240 may, for example, receive RF signals from communication interface 230 and transmit them over the air, and receive RF signals over the air and provide them to communication interface 230. In one implementation, for example, communication interface 230 may communicate with a network and/or devices connected to a network.

As will be described in detail below, device 100 may perform certain operations described herein in response to processor 200 executing software instructions of an application contained in a computer-readable medium, such as memory 210. A computer-readable medium may be defined as a physical or logical memory device. A logical memory device may include memory space within a single physical memory device or spread across multiple physical memory devices. The software instructions may be read into memory 210 from another computer-readable medium or from another device via communication interface 230. The software instructions contained in memory 210 may cause processor 200 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 100, in other implementations, device 100 may contain fewer, different, differently arranged, or additional components than depicted in FIG. 2. In still other implementations, one or more components of device 100 may perform one or more other tasks described as being performed by one or more other components of device 100.

FIG. 3 depicts a diagram of an exemplary implementation of a user interface 300 capable of being provided by device 100 (e.g., via display 120 of device 100). User interface 300 and the user interfaces depicted in FIGS. 4-7C (collectively referred to as "user interfaces") may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, television interfaces, etc.). The user interfaces may receive user inputs via one or more input devices, may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., via display 120 of device 100).

As shown in FIG. 3, user interface 300 may include separate graphical windows 310-1, 310-2, . . . , 310-N (referred to herein collectively as "windows 310" and singularly as "window 310") that can be presented to the user by sliding each window onto all or a portion of display 120 of device 100. A "window," as used herein, is intended to be broadly interpreted to include any display mechanism (e.g., a window, a menu, etc.) capable of being displayed by display 120. For example, window 310 may include an enclosed area on a display screen (e.g., display 120) that may display information and/or may permit execution of an application (e.g., by device 100). The number of windows 310 provided by display 120, the types of windows 310, the types of information provided in windows 310, the arrangement of windows 310 on display 120, etc. may be configured by a user of device 100.

In one exemplary implementation, each window 310 of user interface 300 may present display elements (e.g., keys, icons, buttons, links, etc.) 320 and/or information that may be unrelated to the other windows 310. For example, one window 310 may include a unique group of application icons, while another window 310 may include different icons for particular applications. Additionally, some display elements 320 may be presented within window 310 as a vertical stack 330 that a user may scroll through vertically to display additional display elements 320. User input, such as a horizontal touch gesture on a touch-sensitive screen (e.g., display 120), may be applied to slide a new window 310 onto user interface 300. In one example, user input for items displayed within a particular window 310 may be limited to item selections (e.g., selection of a display element 320) and/or vertical touch gestures. In some implementations, user interface 300 may include a dynamic footer 340 that indicates a relative position of a displayed window (e.g., window 310-2) among the other windows (e.g., windows 310-1 and 310-N).

As further shown in FIG. 3, each window 310 may include a background color that is different than background colors associated with other windows. For example, window 310-1 may include a background of a first color 350-1, window 310-2 may include a background of a second color 350-2 (e.g., different than first color 350-1), and window 310-N may include background of an Nth color 350-3 (e.g., different than first color 350-1 and second color 350-2). In one exemplary implementation, device 100 may map (or associate) distinct background colors (e.g., colors 350-1, 350-2, and 350-N) to (or with) windows 310 based on a color sphere, as described below in connection with FIG. 6A. A color sphere (also known as a color solid) may include a three-dimensional representation of a color model that depicts the variables of hue (e.g., red, green, blue, etc.), brightness (e.g., gradations of light and dark), and saturation. A color sphere may depict all conceivable colors in an organized three-dimensional structure.

In another exemplary implementation, device 100 may map distinct background colors to windows 310 based on a color wheel, as described below in connection with FIG. 6B. A color wheel (also known as a color circle) may include a two-dimensional representation of a color model that depicts the variables of hue and brightness. In still another exemplary implementation, device 100 may map distinct background colors to windows 310 based on a color spectrum, as described below in connection with FIG. 6C. A color spectrum (also known as a visible spectrum) may include a portion of the electromagnetic spectrum that is visible to (e.g., can be detected by) the human eye. The color spectrum may include all the colors that the human eyes and brain can distinguish.

As further shown in FIG. 3, user interface 300 may provide a flash 360 of color (or some other color-based visual stimulus, such as blinking, a blending of colors from adjacent windows, etc.) to a user of device 100 to indicate a transition from one window (e.g., window 310-1) to another window (e.g., window 310-2). For example, if the user transitions (e.g., via a horizontal or vertical touch gesture on display 120) from window 310-1 to window 310-2, user interface 300 may provide flash 360 (e.g., may increase the brightness) of second color 350-2 of window 310-2. The user may visually sense flash 360 during navigation of windows 310. Flash 360 may indicate to the user that a new window 310 is displayed on user interface 300.

Although FIG. 3 shows an exemplary user interface 300, in other implementations, user interface 300 may be arranged differently than depicted in FIG. 3. For example, windows 110 may include a different number and/or arrangement of display elements 320. Also, user interface 300 may include a different number and/or arrangement of windows 310 and/or a different type of dynamic footer 340.

FIG. 4 illustrates a diagram of exemplary sliding window and color-based content navigation operations capable of being performed by device 100 (e.g., via display 120). In FIG. 4, a user interface (e.g., provided by display 120) is shown as a function of time progressing from time $t_0$ to time $t_1$. At time $t_0$, window 310-4 may be displayed. Window 310-4 may include a group of display elements 320 previously assigned to window 310-4. Display elements 320 shown in window 310-4 may be selected by a user to, for example, launch an application associated with a display element 320. In one example, display elements 320 may be related to each other (e.g., display elements 320 may be associated with related file types (e.g., music files, word processing files, etc.), applications, etc.).

As further shown in FIG. 4, window 310-4 may encompass an entire available viewing area of display 120 (or a portion thereof), and may include a background with a fourth color 350-4. In one exemplary implementation, device 100 may have previously mapped fourth color 350-4 to window 310-4 based on a color sphere, a color wheel, and/or a color spectrum, as described below in connection with FIGS. 6A-6C. Dynamic footer 340 may be provided at the bottom of window 310-4, and may include an indication of where window 310-4 lies in a sequence of available windows 310. For example, as shown in FIG. 4, at time $t_0$, window 310-4 may be shown as a fourth window in a sequence of seven windows 310. At time $t_0$, a user may apply a touch 400 to touch-sensitive display 120 in the area of window 310-4. Touch 400 may slide in a direction indicated on FIG. 4, which device 100 may interpret as a horizontal gesture to change the window viewable on display 120. Window 110-4 may appear to scroll to the user's the right.

At time $t_1$, another window 310-3 may be presented to the user. As shown by dynamic footer 340, window 310-3 may be a next window (to the user's apparent left of window 310-4) in the sequence of available windows 310. Depending on the horizontal gesture interpreted by device 100 (e.g., the speed and/or length of the slide of touch 400), device 100 may scroll to a next window (e.g., window 310-3) in the sequence of windows 310 or device 100 may scroll past multiple windows 310. As shown in FIG. 4, window 310-3 may include a group of display elements 320 and vertical stack 330 (e.g., a list of items related to a particular display element) previously assigned to window 310-3. Display elements 320 and/or other information shown in window 310-3 may be unrelated to (or partly related to) display elements 320 shown in window 310-4. For example, as shown in FIG. 4, window 310-3 may include display elements 320 and a list of information associated with an email application. A user may select one of display elements 320 (e.g., using a "tap" touch gesture), may scroll down a list of information (e.g., using a vertical touch gesture), or may switch to another window 310 (e.g., using a horizontal touch gesture). Thus, a user can manipulate the user interface of device 100 using just three basic gestures. In other implementations described below, other types of user input may be used to manipulate the user interface of device 100.

As further shown in FIG. 4, window 310-3 may include a background with a third color 350-3 (e.g., that is different than fourth color 350-4). In one exemplary implementation, device 100 may have previously mapped third color 350-3 to window 310-3 based on a color sphere, a color wheel, and/or a color spectrum, as described below in connection with FIGS. 6A-6C. The user interface of device 100 may provide a flash 410 (e.g., may increase the brightness) of third color 350-3 (or some other color-based visual stimulus) to a user of device 100 to indicate the transition from window 310-4 to window 310-3. The user may visually sense flash 410 during navigation of windows 310-3 and 310-4, and flash 410 (e.g., and the change from color 310-4 to color 310-3) may indicate to the user that a new window 310 (e.g., window 310-3) is displayed on the user interface of device 100.

Although FIG. 4 shows exemplary sliding window and color-based content navigation operations associated with device 100, in other implementations, device 100 may perform fewer, different, or additional operations than depicted in FIG. 4.

FIGS. 5A and 5B depict diagrams of exemplary sliding window and color-based content navigation operations capable of being performed by device 100 (e.g., via display 120), when device 100 is provided in a different orientation (e.g., a landscape orientation) than the orientation depicted in FIG. 4. As shown in FIG. 5A, device 100 may include display 120. Display 120 may show a user interface that is configured to display two windows 310-3 and 310-4 and dynamic footer 340. Windows 310-3 and 310-4 may include the features described above in connection with, for example, FIG. 4. Dynamic footer 340 may display icons/symbols corresponding to each available window in the user interface of device 100. Dynamic footer 340 may indicate the currently displayed windows 310-3 and 310-4 to the user relative to the sequence of other available windows 310. The user interface may encompass the entire viewable area (or a portion) of display 120, and may leave room for other information that may not be affected by user input to the user interface.

As further shown in FIG. 5A, a user may apply a touch 500 to touch-sensitive display 120 in the area of window 310-3. Touch 500 may slide in a direction indicated on FIG. 5A, which device 100 may interpret as a horizontal gesture to change the window(s) viewable on display 120. Windows 310-3 and 310-4 may appear to scroll to the user's left.

As shown in FIG. 5B, another window 310-5 may be presented to the user along with window 310-4. Window 310-5 may include a group of display elements 320 (e.g., music files) and/or other information previously assigned to window 310-5. Display elements 320 and/or other information shown in window 310-5 may be unrelated to (or partly related to) display elements 320 shown in window 310-4. Window 310-5 may be a next window (to the user's apparent right of window 310-4) in the sequence of available windows 310. Depending on the horizontal gesture interpreted by device 100 (e.g., the speed and/or length of the slide of touch 500), device 100 may scroll to a next window (e.g., window 110-5) in the sequence of windows 310 or device 100 may scroll past multiple windows 310.

As further shown in FIG. 5B, window 310-5 may include a background with a fifth color 350-5 (e.g., that is different than third color 350-3 and fourth color 350-4). In one exemplary implementation, device 100 may have previously mapped fifth color 350-5 to window 310-5 based on a color sphere, a color wheel, and/or a color spectrum, as described below in connection with FIGS. 6A-6C. The user interface of device 100 may provide a flash 510 (e.g., may increase the brightness) of fifth color 350-5 (or some other color-based visual stimulus) to a user of device 100 to indicate the transition from windows 310-3 and 310-4 to windows 310-4 and 310-5. The user may visually sense flash 510 during navigation of windows 310-3, 310-4 and 310-5, and flash 510 may indicate to the user that a new window 310 (e.g., window 310-5) is displayed on the user interface of device 100. In another implementation, the user interface of device 100 may provide flash 510 of fourth color 350-4 (e.g., of window 310-4) and of fifth color 350-5 (e.g., of window 310-5) to a user of device 100 to indicate the transition from windows 310-3 and 310-4 to windows 310-4 and 310-5. In still another implementation, the user interface of device 100 may provide only flash 510 of fourth color 350-4 (e.g., of window 310-4) to a user of device 100 to indicate the transition from windows 310-3 and 310-4 to windows 310-4 and 310-5.

Although FIGS. 5A and 5B show exemplary sliding window and color-based content navigation operations associated with device 100, in other implementations, device 100 may perform fewer, different, or additional operations than depicted in FIGS. 5A and 5B. Furthermore, although FIGS. 5A and 5B show an exemplary user interface that includes two windows 310, in other implementations, the user interface of device 100 may contain fewer, different, or additional window arrangements than depicted in FIGS. 5A and 5B. For example, in one implementation, device 100 may display more than two windows 310 on display 120. In another exemplary implementation, two or more windows 310 may be displayed with a partial overlapping of windows 310. In still another implementation, windows 310-3 and 310-4 (or windows 310-4 and 310-5) may be displayed simultaneously on separate screens of the same device (e.g., a device with screens on both sides of an open clamshell-type housing). In such an implementation, dynamic footer 340 may span both screens or be duplicated on each of the screens.

FIGS. 6A-6C illustrate diagrams of exemplary window color mappings capable of being performed by device 100. As shown in FIG. 6A, in one exemplary implementation, device 100 may map (e.g., associate) distinct background colors to windows 310 based on a color sphere 600. Color sphere 600 (also known as a color solid) may include a three-dimensional representation of a color model that depicts the variables of hue (e.g., red, green, blue, etc.), brightness (e.g., gradations of light and dark), and saturation. Color sphere 600 may depict all conceivable colors in an organized three-dimensional structure. In one example, as shown in FIG. 6A, device 100 may map 610-1 a portion (e.g., a particular color, such as first color 350-1) of color sphere 600 to window 310-1, and window 310-1 may display first color 350-1 as its background color. In another example, device 100 may map 610-N another portion (e.g., a particular color, such as Nth color 350-N) of color sphere 600 to window 310-N, and window 310-N may display Nth color 350-N as its background color.

As shown in FIG. 6B, in another exemplary implementation, device 100 may map (e.g., associate) distinct background colors to windows 310 based on a color wheel 620. Color wheel 620 (also known as a color circle) may include a two-dimensional representation of a color model that depicts the variables of hue and brightness. In one example, as shown in FIG. 6B, device 100 may map 630-1 a portion (e.g., a particular color, such as first color 350-1) of color wheel 620 to window 310-1, and window 310-1 may display first color 350-1 as its background color. In another example, device 100 may map 630-N another portion (e.g., a particular color, such as Nth color 350-N) of color wheel 620 to window 310-N, and window 310-N may display Nth color 350-N as its background color.

As shown in FIG. 6C, in still another exemplary implementation, device 100 may map (e.g., associate) distinct background colors to windows 310 based on a color spectrum 640. Color spectrum 640 (also known as a visible spectrum) may include a portion of the electromagnetic spectrum that is visible to (e.g., can be detected by) the human eye. Color spectrum 640 may include all the colors that the human eyes and brain can distinguish. In one example, as shown in FIG. 6C, device 100 may map 650-1 a portion (e.g., a particular color, such as first color 350-1) of color spectrum 640 to window 310-1, and window 310-1 may display first color 350-1 as its background color. In another example, device 100 may map 650-N another portion (e.g., a particular color, such as Nth color 350-N) of color spectrum 640 to window 310-N, and window 310-N may display Nth color 350-N as its background color.

Although FIGS. 6A-6C show exemplary window color mappings associated with device 100, in other implementations, device 100 may perform fewer, different, or additional window background mappings than depicted in FIGS. 6A-6C. For example, in one implementation, device 100 may map different background patterns, different background pictures, different contrasts, hues, etc. of background colors, etc. to windows 310 rather than distinct background colors. In an exemplary implementation, device 100 may automatically map background colors to windows 310 based the content of windows 310 or other user-defined rules. For example, a user may want multiple windows 310 (e.g., windows 310 containing music files) to be the same color.

FIGS. 7A-7C depict diagrams of exemplary color-based input mechanisms for performing navigation operations capable of being performed by device 100 (e.g., via display 120). In FIG. 7A, a user interface (e.g., provided by display 120) is shown as a function of time progressing from time $t_0$ to time $t_1$. At time $t_0$, window 310-4 may be displayed and may include the features described above in connection with, for example, FIGS. 4-5B.

As further shown in FIG. 7A, window 310-4 may encompass an entire available viewing area of display 120 (or a portion thereof), and may include a background with fourth color 350-4. A color sphere input mechanism 700 may be provided within (or outside of) window 310-4, and may enable the user of device 100 to navigate through a sequence of available windows 310. Color sphere input mechanism 700 may include a representation of a color sphere (e.g., described above in connection with FIG. 6A) displayed on a portion of display 120. Color sphere input mechanism 700 may enable the user to navigate through available windows 310 via application of a touch to a portion of the color sphere (e.g., which is sensed by touch-sensitive display 120). For example, at time $t_0$, a user may apply a touch to touch-sensitive display 120 in the area of color sphere input mechanism 700. The touch may select a color of the color sphere, which device 100 may interpret as a gesture to change the window viewable on display 120 (e.g., to the window mapped to the selected color, as described above in connection with FIG. 6A). For example, at time $t_1$, the user may select third color 350-3 of the color sphere, and another window 310-3 (e.g., associated with third color 350-3) may be presented to the user (e.g., via display 120).

Depending on the gesture interpreted by device 100 (e.g., the location of the touch or a sliding touch over multiple portions of color sphere input mechanism 700), device 100 may scroll to a particular window (e.g., window 310-3) in the sequence of windows 310 or device 100 may scroll through multiple windows 310. Window 310-3 may include color sphere input mechanism 700 and may include the features described above in connection with, for example, FIG. 4. A user may select one of display elements 320 (e.g., using a "tap" touch gesture), may scroll down a list of information (e.g., using a vertical touch gesture), or may switch to another window 310 (e.g., using color sphere input mechanism 700). As further shown in FIG. 7A, the user interface of device 100 may provide a flash 710 (e.g., may increase the brightness) of third color 350-3 (or some other color-based visual stimulus) to a user of device 100 to indicate the transition from window 310-4 to window 310-3. The user may visually sense flash 710 during navigation of windows 310-3 and 310-4 (e.g., via color sphere input mechanism 700), and flash 710 (e.g., and the change from color 310-4 to color 310-3) may indicate to the user that a new window 310 (e.g., window 310-3) is displayed on the user interface of device 100.

In FIG. 7B, a user interface (e.g., provided by display 120) is shown as a function of time progressing from time $t_0$ to time $t_1$. At time $t_0$, window 310-4 may be displayed and may include the features described above in connection with, for example, FIGS. 4-5B. Window 310-4 may encompass an entire available viewing area of display 120 (or a portion thereof), and may include a background with fourth color 350-4.

As further shown in FIG. 7B, a color wheel input mechanism 720 may be provided within (or outside of) window 310-4, and may enable the user of device 100 to navigate through a sequence of available windows 310. Color wheel input mechanism 720 may include a representation of a color wheel (e.g., described above in connection with FIG. 6B) displayed on a portion of display 120. Color wheel input mechanism 720 may enable the user to navigate through available windows 310 via application of a touch to a portion of the color wheel (e.g., which is sensed by touch-sensitive display 120). For example, at time $t_0$, a user may apply a touch to touch-sensitive display 120 in the area of color wheel input mechanism 720. The touch may select a color of the color wheel, which device 100 may interpret as a gesture to change the window viewable on display 120 (e.g., to the window mapped to the selected color, as described above in connection with FIG. 6B). For example, at time $t_1$, the user may select third color 350-3 of the color wheel, and another window 310-3 (e.g., associated with third color 350-3) may be presented to the user (e.g., via display 120).

Depending on the gesture interpreted by device 100 (e.g., the location of the touch or a sliding touch over multiple portions of color wheel input mechanism 720), device 100 may scroll to a particular window (e.g., window 310-3) in the sequence of windows 310 or device 100 may scroll through multiple windows 310. Window 310-3 may include color wheel input mechanism 720 and may include the features described above in connection with, for example, FIG. 4. A user may select one of display elements 320 (e.g., using a "tap" touch gesture), may scroll down a list of information (e.g., using a vertical touch gesture), or may switch to another window 310 (e.g., using color wheel input mechanism 720). As further shown in FIG. 7B, the user interface of device 100 may provide a flash 730 (e.g., may increase the brightness) of third color 350-3 (or some other color-based visual stimulus) to a user of device 100 to indicate the transition from window 310-4 to window 310-3. The user may visually sense flash 730 during navigation of windows 310-3 and 310-4 (e.g., via color wheel input mechanism 720), and flash 730 (e.g., and the change from color 310-4 to color 310-3) may indicate to the user that a new window 310 (e.g., window 310-3) is displayed on the user interface of device 100.

In FIG. 7C, a user interface (e.g., provided by display 120) is shown as a function of time progressing from time $t_0$ to time $t_1$. At time $t_0$, window 310-4 may be displayed and may include the features described above in connection with, for example, FIGS. 4-5B. Window 310-4 may encompass an entire available viewing area of display 120 (or a portion thereof), and may include a background with fourth color 350-4.

As further shown in FIG. 7C, a color spectrum input mechanism 740 may be provided within (or outside of) window 310-4, and may enable the user of device 100 to navigate through a sequence of available windows 310. Color spectrum input mechanism 740 may include a representation of a color spectrum (e.g., described above in connection with FIG. 6C) displayed on a portion of display 120. Color spectrum input mechanism 740 may enable the user to navigate through available windows 310 via application of a touch to a portion of the color spectrum (e.g., which is sensed by touch-sensitive display 120). For example, at time $t_0$, a user may apply a touch to touch-sensitive display 120 in the area of color spectrum input mechanism 740. The touch may select a color of the color spectrum, which device 100 may interpret as a gesture to change the window viewable on display 120 (e.g., to the window mapped to the selected color, as described above in connection with FIG. 6C). For example, at time $t_1$, the user may select third color 350-3 of the color spectrum, and another window 310-3 (e.g., associated with third color 350-3) may be presented to the user (e.g., via display 120).

Depending on the gesture interpreted by device 100 (e.g., the location of the touch or a sliding touch over multiple portions of color spectrum input mechanism 740), device 100 may scroll to a particular window (e.g., window 310-3) in the sequence of windows 310 or device 100 may scroll through multiple windows 310. Window 310-3 may include color spectrum input mechanism 740 and may include the features described above in connection with, for example, FIG. 4. A user may select one of display elements 320 (e.g., using a "tap" touch gesture), may scroll down a list of information (e.g., using a vertical touch gesture), or may switch to another window 310 (e.g., using color spectrum input mechanism 740). As further shown in FIG. 7C, the user interface of device 100 may provide a flash 750 (e.g., may increase the brightness) of third color 350-3 (or some other color-based visual stimulus) to a user of device 100 to indicate the transition from window 310-4 to window 310-3. The user may visually sense flash 750 during navigation of windows 310-3 and 310-4 (e.g., via color spectrum input mechanism 740), and flash 750 (e.g., and the change from color 310-4 to color 310-3) may indicate to the user that a new window 310 (e.g., window 310-3) is displayed on the user interface of device 100.

Although FIGS. 7A-7C show exemplary color-based input mechanisms for performing navigation operations associated with device 100, in other implementations, device 100 may perform fewer, different, or additional operations than depicted in FIGS. 7A-7C. In still other implementations, device 100 may include different, additional, or differently arranged color-based input mechanisms than depicted in FIGS. 7A-7C.

FIGS. 8A-12 illustrate flow charts of an exemplary process 800 for color-based content mapping and navigation according to implementations described herein. In one implementation, process 800 may be performed by device 100. In another implementation, some or all of process 800 may be performed by another device or group of devices, including or excluding device 100.

As illustrated in FIG. 8A, process 800 may include receiving initial window configuration parameters (block 805), receiving user window configuration parameters (block 810), and storing the window configuration parameters, where the window configuration parameters include an arrangement of windows with associated display elements (block 815). For example, device 100 may receive initial window configuration parameters from, for example, an original equipment manufacturer (OEM) or software provider. Initial window configuration parameters may include, for example, templates for particular windows, sequencing of windows, user input triggers (e.g., touch gestures, control buttons, keypad input, etc.), icons/images, transition animations, and links to particular content, links to particular applications, and/or links to particular memory locations. In another example, device 100 may receive user input to supplement (e.g., personalize) the initial windows configuration parameters. User windows configuration parameters may include, for example, user preferences, additional images/icons, and different sequencing of windows 310. User windows configuration parameters may also include ordering display elements 320 within particular windows. The user windows configuration parameters may be provided by the user to device 100 (e.g., via user interface 220) and/or may be downloaded from another source to device 100 (e.g., via communication interface 230). User windows configuration parameters may continue to be added and updated throughout the lifecycle of device 100. The initial and/or user windows configuration parameters may be stored, for example, in memory 210 of device 100.

As further shown in FIG. 8A, a distinct background color may be associated with each window (block 820), one window (e.g., from the arrangement of windows), with a first background color, may be displayed via a display (block 825), and a user input to a user interface may be received (block 830). For example, in implementations described above in connection with FIG. 4, window 310-4 may encompass an entire available viewing area of display 120 (or a portion thereof) and may include a background with fourth color 350-4. In one example, device 100 may have previously mapped fourth color 350-4 to window 310-4 based on a color sphere, a color wheel, and/or a color spectrum, and based on the content contained in window 310-4. At time $t_0$, a user may apply a user input (e.g., touch 400) to touch-sensitive display 120 in the area of window 310-4. In one example, the user input may be in the form of a touch gesture (such as a tap to select an icon, a horizontal slide, or a vertical slide) on touch-sensitive display 120. In another example, the user input may be in the form of manipulation of a control button, such as a dedicated button to indicate a selection or a directional indicator (such as a joystick or trackball) to indicate a vertical or horizontal scroll. In a further example, the user input may be in the form of a keypad or keyboard input, such as a "Tab" or "Enter" key to indicate a selection, or an arrow key to indicate a vertical or horizontal direction input. In other implementations, different forms of user input or a combination of forms of user input may be used.

As shown in FIG. 8B, a type of user input may be determined (block 835). If the user input type is a selection input (block 835—SELECTION), an application associated with a selected display element may be opened (or executed) (block 840). For example, device 100 may open (or execute) an item, such as file, application, or other object associated with one of display elements 320.

As further shown in FIG. 8B, if the user input type is a horizontal direction input (block 835—HORIZONTAL), the windows may be scrolled horizontally in the direction of the horizontal direction input (block 845), and another window (e.g., from the arrangement of windows), with a second background color, may be displayed via the display and a flash of the second background color may be displayed via the display (block 850). For example, in implementations described above in connection with FIG. 4, based on horizontal touch 400, another window 310-3 may be presented to the user. As shown by dynamic footer 340, window 310-3 may be a next window (to the user's apparent left of window 310-4) in the sequence of available windows 310. Depending on the horizontal gesture interpreted by device 100 (e.g., the speed and/or length of the slide of touch 400), device 100 may scroll to a next window (e.g., window 310-3) in the sequence of windows 310 or device 100 may scroll past multiple windows 310. Window 310-3 may include a background with third color 350-3 (e.g., that is different than fourth color 350-4). In one example, device 100 may have previously mapped third color 350-3 to window 310-3 based on a color sphere, a color wheel, and/or a color spectrum. The user interface of device 100 may provide flash 410 (e.g., may increase the brightness) of third color 350-3 (or some other color-based visual stimulus) to a user of device 100 to indicate the transition from window 310-4 to window 310-3. The user may visually sense flash 410 during navigation of windows 310-3 and 310-4, and flash 410 may indicate to the user that a new window 310 (e.g., window 310-3) is displayed on the user interface of device 100.

Returning to FIG. 8B, if the user input type is a vertical direction input (block 835—VERTICAL), the windows may be scrolled vertically in the direction of the vertical direction input (block 855), and another window (e.g., from the arrangement of windows), with a second background color, may be displayed via the display and a flash of the second background color may be displayed via the display (block 860). For example, with reference to FIG. 4, based on a vertical gesture, another window 310-3 may be presented to the user. Window 310-3 may be a next window in the sequence of available windows 310. Depending on the vertical gesture interpreted by device 100 (e.g., the speed and/or length of the slide of the vertical gesture), device 100 may scroll to a next window (e.g., window 310-3) in the sequence of windows 310 or device 100 may scroll past multiple windows 310. Window 310-3 may include a background with third color 350-3 (e.g., that is different than fourth color 350-4). In one example, device 100 may have previously mapped third color 350-3 to window 310-3 based on a color sphere, a color wheel, and/or a color spectrum. The user interface of device 100 may provide flash 410 (e.g., may increase the brightness) of third color 350-3 (or some other color-based visual stimulus) to a user of device 100 to indicate the transition from window 310-4 to window 310-3. The user may visually sense flash 410 during navigation of windows 310-3 and 310-4, and flash 410 may indicate to the user that a new window 310 (e.g., window 310-3) is displayed on the user interface of device 100.

Process block 820 may include the process blocks illustrated in FIG. 9. As shown in FIG. 9, process block 820 may include associating a distinct background color with each window based on a color sphere (block 900), associating a distinct background color with each window based on a color wheel (block 910), or associating a distinct background color with each window based on a color spectrum (block 920). For example, in implementations described above in connection with FIGS. 3 and 6A-6C, device 100 may map (or associate) distinct background colors (e.g., colors 350-1, 350-2, and 350-N) to (or with) windows 310 based on color sphere 600. Color sphere 600 may include a three-dimensional representation of a color model that depicts the variables of hue (e.g., red, green, blue, etc.), brightness (e.g., gradations of light and dark), and saturation. Color sphere 600 may depict all conceivable colors in an organized three-dimensional structure. In another example, device 100 may map distinct background colors to windows 310 based on color wheel 620. Color wheel 620 may include a two-dimensional representation of a color model that depicts the variables of hue and brightness. In still another example, device 100 may map distinct background colors to windows 310 based on color spectrum 640. Color spectrum 640 may include a portion of the electromagnetic spectrum that is visible to (e.g., can be detected by) the human eye. Color spectrum 640 may include all the colors that the human eyes and brain can distinguish.

Process blocks 825, 830, 850, and 860 may include the process blocks illustrated in FIG. 10. As shown in FIG. 10, process blocks 825, 830, 850, and 860 may include displaying a color sphere input mechanism via the display (block 1000), receiving, via the user interface, user manipulation of the color sphere input mechanism (block 1010), and displaying another window (e.g., from the arrangement of windows), with a second background color, and displaying a flash of the second background color via the display (block 1020). For example, in implementations described above in connection with FIG. 7A, color sphere input mechanism 700 may be provided within (or outside of) window 310-4. Color sphere input mechanism 700 may include a representation of a color sphere, and may enable the user to navigate through available windows 310 via application of a touch to a portion of the color sphere (e.g., which is sensed by touch-sensitive display 120). In one example, the user may select third color 350-3 of the color sphere, and another window 310-3 (e.g., associated with third color 350-3) may be presented to the user (e.g., via display 120). The user interface of device 100 may provide flash 710 (e.g., may increase the brightness) of third color 350-3 to a user of device 100 to indicate the transition from window 310-4 to window 310-3. The user may visually sense flash 710 during navigation of windows 310-3 and 310-4 (e.g., via color sphere input mechanism 700), and flash 710 may indicate to the user that a new window 310 (e.g., window 310-3) is displayed on the user interface of device 100.

Alternatively and/or additionally, process blocks 825, 830, 850, and 860 may include the process blocks illustrated in FIG. 11. As shown in FIG. 11, process blocks 825, 830, 850, and 860 may include displaying a color wheel input mechanism via the display (block 1100), receiving, via the user interface, user manipulation of the color wheel input mechanism (block 1110), and displaying another window (e.g., from the arrangement of windows), with a second background color, and displaying a flash of the second background color via the display (block 1120). For example, in implementations described above in connection with FIG. 7B, color wheel input mechanism 720 may be provided within (or outside of) window 310-4, and may include a representation of a color wheel. Color wheel input mechanism 720 may enable the user to navigate through available windows 310 via application of a touch to a portion of the color wheel (e.g., which is sensed by touch-sensitive display 120). In one example, the user may select third color 350-3 of the color wheel, and another window 310-3 (e.g., associated with third color 350-3) may be presented to the user (e.g., via display 120). The user interface of device 100 may provide flash 730 (e.g., may increase the brightness) of third color 350-3 to a user of device 100 to indicate the transition from window 310-4 to window 310-3. The user may visually sense flash 730 during navigation of windows 310-3 and 310-4 (e.g., via color wheel input mechanism 720), and flash 730 may indicate to the user that a new window 310 (e.g., window 310-3) is displayed on the user interface of device 100.

Figure 12:
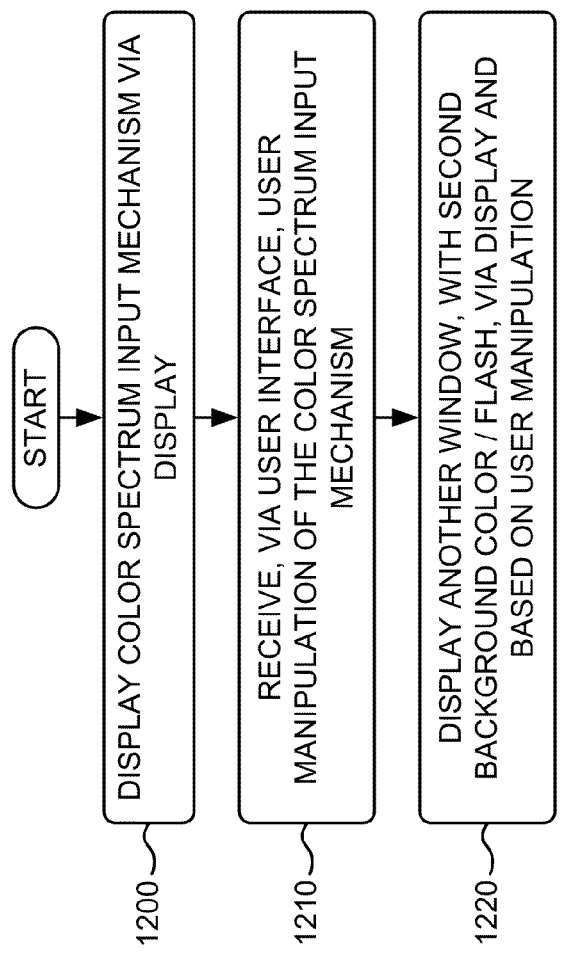

Alternatively and/or additionally, process blocks 825, 830, 850, and 860 may include the process blocks illustrated in FIG. 12. As shown in FIG. 12, process blocks 825, 830, 850, and 860 may include displaying a color spectrum input mechanism via the display (block 1200), receiving, via the user interface, user manipulation of the color spectrum input mechanism (block 1210), and displaying another window (e.g., from the arrangement of windows), with a second background color, and displaying a flash of the second background color via the display (block 1220). For example, in implementations described above in connection with FIG. 7C, color spectrum input mechanism 740 may be provided within (or outside of) window 310-4, and may include a representation of a color spectrum. Color spectrum input mechanism 740 may enable the user to navigate through available windows 310 via application of a touch to a portion of the color spectrum (e.g., which is sensed by touch-sensitive display 120). In one example, the user may select third color 350-3 of the color spectrum, and another window 310-3 (e.g., associated with third color 350-3) may be presented to the user (e.g., via display 120). The user interface of device 100 may provide flash 750 (e.g., may increase the brightness) of third color 350-3 (or some other color-based visual stimulus) to a user of device 100 to indicate the transition from window 310-4 to window 310-3. The user may visually sense flash 750 during navigation of windows 310-3 and 310-4 (e.g., via color spectrum input mechanism 740), and flash 750 may indicate to the user that a new window 310 (e.g., window 310-3) is displayed on the user interface of device 100.

Figure 13:
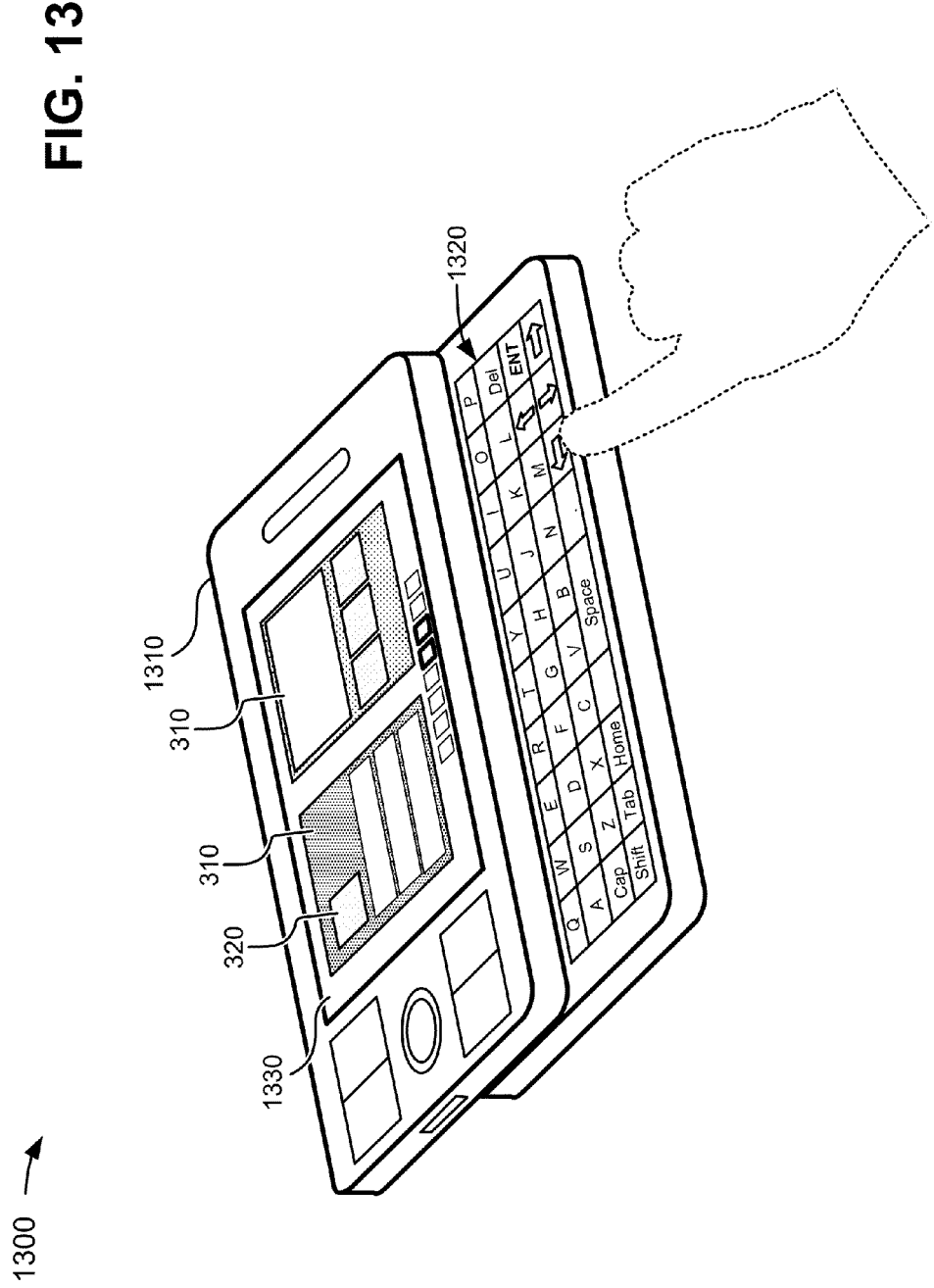
FIG. 13 provides an illustration of an exemplary implementation of a control-button interface on a mobile device.

FIG. 13 provides an illustration of an exemplary implementation of a control-button interface on a mobile device 1300. As shown, mobile device 1300 may include a housing 1310, a keypad 1320, and a display 1330. Other components, such as control buttons, a microphone, a camera, connectivity ports, memory slots, and/or speakers, may be located on mobile device 1300, including, for example, on a rear, sliding, or side panel of housing 1310.

User input on keypad 1320 may be associated with display 1330 by, for example, toggling between defined user input locations within a window (using, e.g., a "Tab" key or a letter key associated with a display element 320 within a window 310). For example, in one implementation, a user may toggle between display elements 320 within window 310 by using, for example, vertical arrow keys and/or "Tab" keys of keypad 1320. A display element 320 may be selected by pressing, for example, an "Enter" key of keypad 1320 after highlighting display element 320 using the arrow keys and/or "Tab" keys. Windows 310 may be changed, for example, by using horizontal arrows on keypad 1320. In one exemplary implementation, mobile device 1300 may provide color-coded panels or backgrounds for multiple windows 310 capable of being presented on display 1330, in a manner described herein.

Although FIG. 13 shows exemplary components of mobile device 1300, in other implementations, mobile device 1300 may contain fewer, different, differently arranged, or additional components than depicted in FIG. 13. In still other implementations, one or more components of mobile device 1300 may perform one or more other tasks described as being performed by one or more other components of mobile device 1300.

Figure 14:
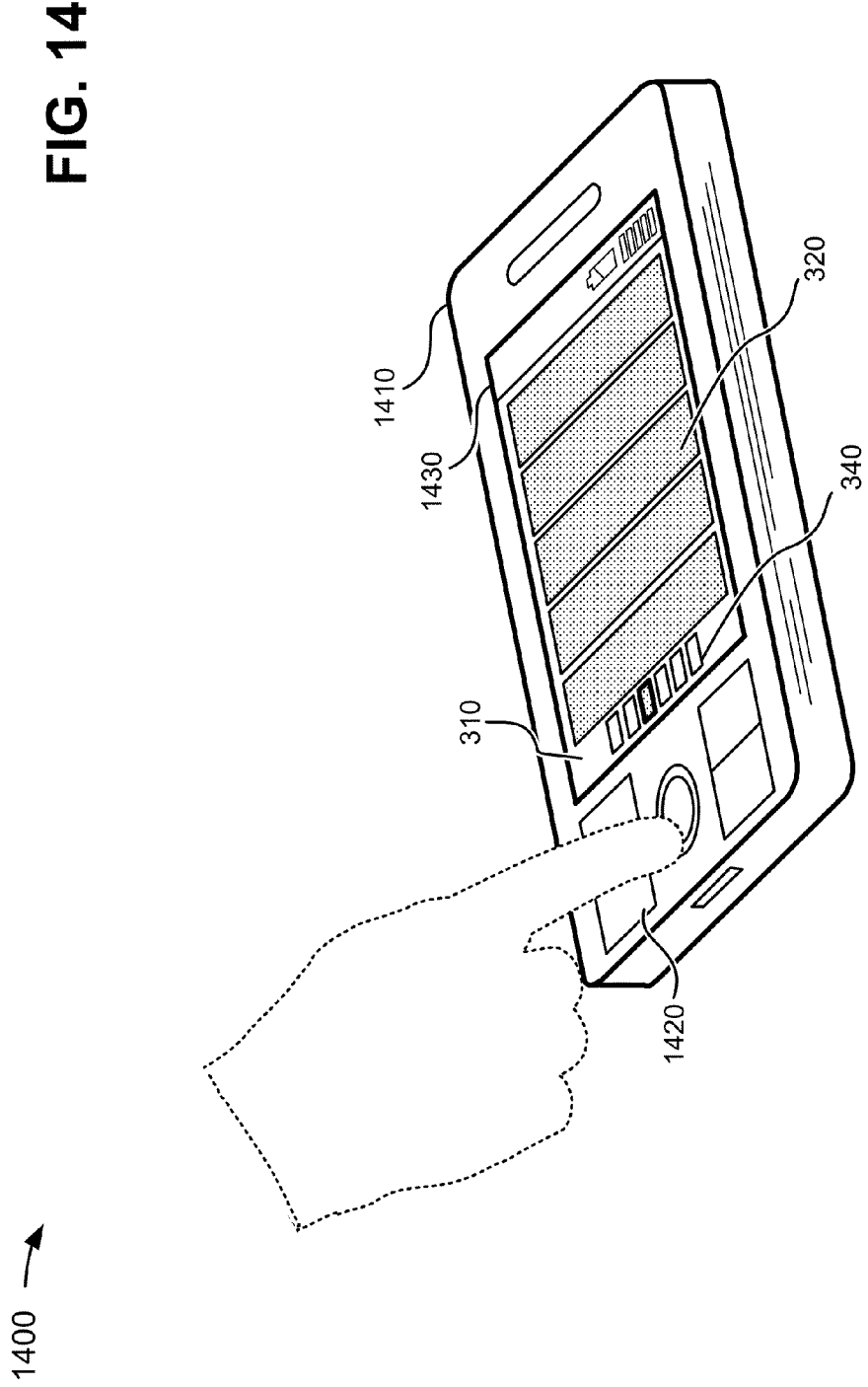
FIG. 14 provides an illustration of an exemplary implementation of a touch-pad interface on a mobile device.

FIG. 14 provides an illustration of an exemplary implementation of a touch-pad interface on a mobile device 1400. As shown, mobile device 1400 may include a housing 1410, control buttons 1420, and a display 1430. Other components, such as a keypad, a microphone, a camera, connectivity ports, memory slots, and/or speakers, may be located on mobile device 1400, including, for example, on a rear, sliding, or side panel of housing 1410.

User input via control buttons 1420 may be associated with display 1430 by, for example, toggling between defined user input locations within a window 310. For example, in one implementation, control buttons 1420 may include a dedicated control button to activate navigation of display 1430. Once activated, a user may toggle vertically between display elements 320 within window 310 by using, for example, a joystick, trackball, or direction pad associated with control buttons 1420. A display element 320 may be selected by pressing, for example, another one of control buttons 1420 after highlighting display element 320 using the joystick, trackball, or direction pad. Windows 310 may be changed, for example, by using horizontal direction indications on control buttons 1420. In one exemplary implementation, mobile device 1400 may provide color-coded panels or backgrounds for multiple windows 310 capable of being presented on display 1430, in a manner described herein.

Although FIG. 14 shows exemplary components of mobile device 1400, in other implementations, mobile device 1400 may contain fewer, different, differently arranged, or additional components than depicted in FIG. 14. In still other implementations, one or more components of mobile device 1400 may perform one or more other tasks described as being performed by one or more other components of mobile device 1400.

Figure 15:
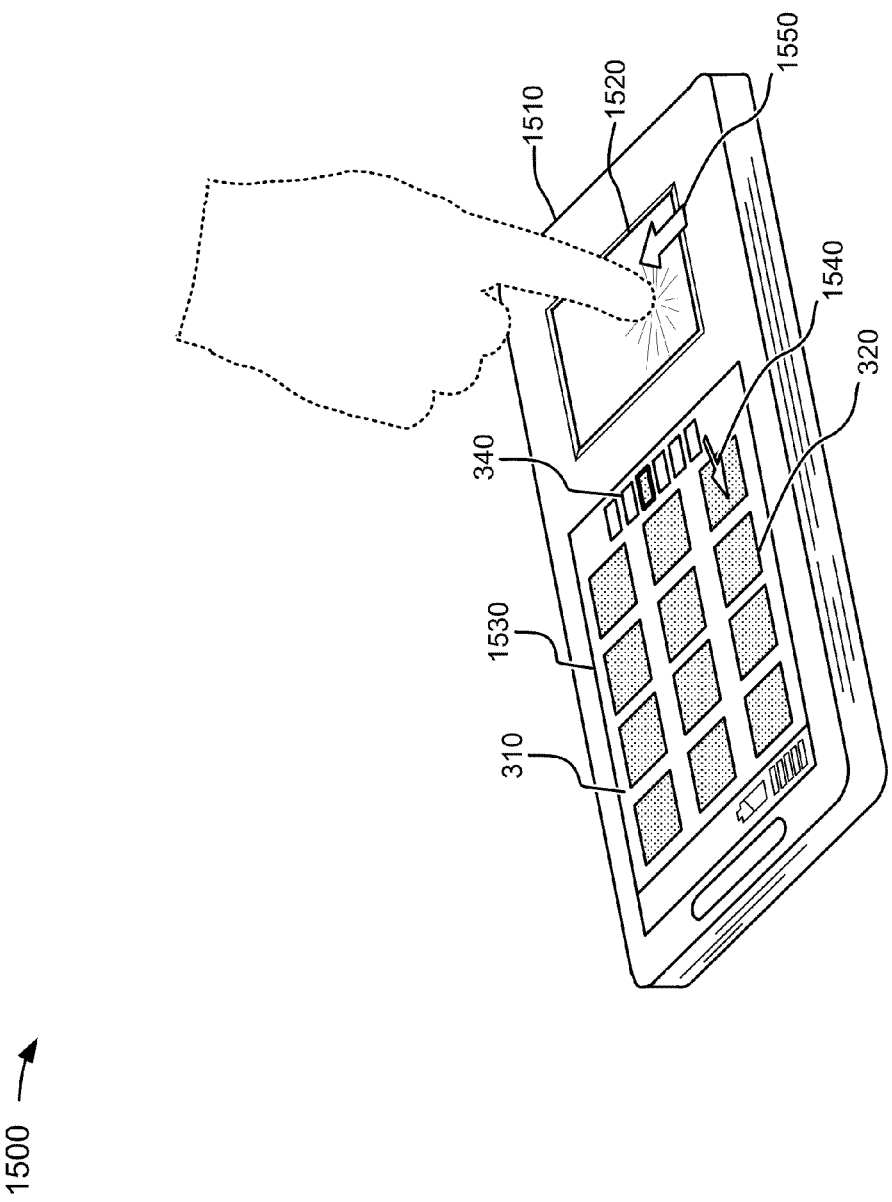
FIG. 15 provides an illustration of an exemplary implementation of a key-pad interface and a dual window display on a mobile device.

FIG. 15 provides an illustration of an exemplary implementation of a key-pad interface and a dual window display on a mobile device 1500. As shown, mobile device 1500 may include a housing 1510, a touch panel 1520, and a display 1530. Other components, such as control buttons, a keypad, a microphone, a camera, connectivity ports, memory slots, and/or speakers, may be located on mobile device 1500, including, for example, on a rear or side panel of housing 1510.

In one example, touch panel 1520 may be separately located from display 1530 on housing 1510. Touch panel 1520 may include any resistive touch panel technology or other technology that provides the ability to register a set of touch coordinates. User input on touch panel 1520 may be associated with display 1530 by, for example, movement and location of a cursor 1540. User input on touch panel 1520 may be in the form of the touch of nearly any object, such as a body part (e.g., a finger, as shown) or a pointing device (e.g., a stylus, pen, etc.).

Touch panel 1520 may be operatively connected with display 1530 to allow the combination of touch panel 1520 and display 1530 to be used as an input device. Touch panel 1520 may identify movement of an object as it moves on the surface of touch panel 1520. Touch panel 1520 may provide a user interface that accepts user input to window 310 (e.g., provided on display 1530). In one example, a touch on touch panel 1520 may be a sliding touch in a direction 1550 indicated in FIG. 15. Device 1500 may detect the sliding touch on touch panel 1520 as a horizontal direction input and may replace a current window 310 with a next window 310 in the window sequence. Device 1500 may also update dynamic footer 340 to indicate the position of the newly displayed window 310 within the window sequence. In one exemplary implementation, mobile device 1500 may provide color-coded panels or backgrounds for multiple windows 310 capable of being presented on display 1530, in a manner described herein.

Although FIG. 15 shows exemplary components of mobile device 1500, in other implementations, mobile device 1500 may contain fewer, different, differently arranged, or additional components than depicted in FIG. 15. In still other implementations, one or more components of mobile device 1500 may perform one or more other tasks described as being performed by one or more other components of mobile device 1500.

Systems and/or methods described herein may provide color-coded panels or backgrounds for multiple windows capable of being presented on a display of a mobile device. Each window may present display elements that may be related to each other but may be unrelated to the other windows. For example, one window may include a unique group of application icons, while another window may include different icons for particular applications. The systems and/or methods may enable a user of the mobile device to navigate the groups of windows based on color (e.g., via a color-based input mechanism). The systems and/or methods may provide a flash of color (or some other color-based visual stimulus) to the user to indicate a transition from one window to another window. The user may visually sense the color-based input mechanism and/or the flash during navigation of the multiple windows. Thus, the systems and/or methods may provide a user interface that may be navigated with few gestures/keystrokes and may minimize the need to "drill down" through multiple menus.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8A-12, the order of the blocks may be modified in other implementations. Further, non-dependent blocks may be performed in parallel. Although FIGS. 8-12 describe navigation of windows 310 via horizontal and vertical input gestures, in other implementations, device 100 may enable navigation of windows via other directional input gestures (e.g., gestures in directions other than the vertical or horizontal directions).

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    associating, by a device, different background colors with a sequence of graphical windows;
    providing, by the device and for display on a screen, a first graphical window, of the sequence of graphical windows, that is associated with a first background color of the different background colors,
        the first graphical window including one or more first icons;
    providing, by the device and for display, a color input mechanism;
    receiving, by the device, a user input via a selection of a particular portion of the color input mechanism;
    determining, by the device, that the particular portion of the color input mechanism matches a second background color of the different background colors;
    automatically navigating, by the device and on the screen, from the first graphical window to a second graphical window, of the sequence of graphical windows, that is associated with the second background color based on the user input,
        the second graphical window including one or more second icons,
        the one or more second icons being different from the one or more first icons, and
        the second background color being different from the first background color; and
    providing, by the device and for display, a visual stimulus associated with the second background color to indicate a transition from the first graphical window to the second graphical window during navigating from the first graphical window to the second graphical window.

2. The method of claim 1, where the visual stimulus includes a flash of the second background color.

3. The method of claim 1, further comprising:
    receiving a directional input; and
    navigating through the sequence of graphical windows in a direction of the directional input by blending colors from adjacent graphical windows, of the sequence of graphical windows, according to positions of the adjacent graphical windows relative to the directional input,
        the adjacent graphical windows including:
            the second graphical window that is in a first position of the positions, and
            a third graphical window that is in a second position of the positions.

4. The method of claim 1, further comprising:
    receiving a horizontal input or a vertical input; and
    scrolling through the sequence of graphical windows in a direction of the horizontal input or the vertical input.

5. The method of claim 1, further comprising:
    receiving a selection input via the first graphical window;

associating a location of the selection input with a particular icon of the one or more first icons; and
executing an application associated with the particular icon.

6. The method of claim 1, where associating the different background colors with the sequence of graphical windows comprises:
associating a distinct background color with each graphical window of the sequence of graphical windows based on colors associated with a color sphere.

7. The method of claim 1, where associating the different background colors with the sequence of graphical windows comprises:
associating a distinct background color with each graphical window of the sequence of graphical windows based on colors associated with a color wheel.

8. The method of claim 1, where associating the different background colors with the sequence of graphical windows comprises:
associating a distinct background color with each graphical window of a sequence of graphical windows based on colors associated with a color spectrum.

9. The method of claim 1, where the color input mechanism includes a color sphere input mechanism.

10. The method of claim 1, where the color input mechanism includes a color wheel input mechanism.

11. The method of claim 1, where the color input mechanism includes a color spectrum input mechanism.

12. A device comprising:
a processor to:
associate different background colors with a sequence of graphical windows,
provide, for display on a touch-sensitive display, a first graphical window, of the sequence of graphical windows, that is associated with a first background color of the different background colors,
the first graphical window including one or more first icons,
provide, for display on the touch-sensitive display, a color input mechanism;
receive a user input via a selection of a particular portion of the color input mechanism,
determine that the particular portion of the color input mechanism matches a second background color of the different background colors,
automatically navigate, on the touch-sensitive display, from the first graphical window to a second graphical window, of the sequence of graphical windows, that is associated with the second background color based on the user input,
the second graphical window including one or more second icons, and
the second background color being different than the first background color, and
provide, for display and during navigating from the first graphical window to the second graphical window, a visual stimulus associated with the second background color to indicate a transition from the first graphical window to the second graphical window.

13. The device of claim 12, where the device comprises one or more of:
a radiotelephone,
a personal communications system (PCS) terminal,
a personal digital assistant (PDA),
a portable gaming system, or
a global positioning system (GPS) device.

14. The device of claim 12, where the visual stimulus includes a flash of the second background color.

15. The device of claim 14, where the flash of the second background color includes an increase in a brightness of the second background color.

16. The device of claim 12, where the processor is further to:
receive a horizontal input, and
scroll through the sequence of graphical windows in a direction of the horizontal input.

17. The device of claim 12, where the processor is further to:
receive a vertical input, and
scroll through the sequence of graphical windows in a direction of the vertical input.

18. The device of claim 12, where the processor is further to:
receive a selection input via the first graphical window,
associate a location of the selection input with a particular icon of the one or more first icons, and
execute an application associated with the particular icon.

19. The device of claim 12, where, when associating different background colors with the sequence of graphical windows, the processor is to one of:
associate a distinct background color with each graphical window of the sequence of graphical windows based on colors provided in a color sphere,
associate a distinct background color with each graphical window of the sequence of graphical windows based on colors provided in a color wheel, or
associate a distinct background color with each graphical window of the sequence of graphical windows based on colors provided in a color spectrum.

20. The device of claim 19,
where the color sphere includes a three-dimensional representation of a color model that depicts hue, brightness, and saturation,
where the color wheel includes a two-dimensional representation of the color model that depicts hue and brightness, and
where the spectrum includes colors that can be detected by a human eye.

21. The device of claim 20, where the color sphere includes colors organized in a three-dimensional structure.

22. The device of claim 12,
where the color input mechanism is within the first graphical window, and
where the color input mechanism includes one of a color sphere input mechanism or a color wheel input mechanism.

23. A non-transitory computer-readable medium storing instructions, the instructions comprising:
one or more instructions that, when executed by at least one processor, cause the at least one processor to:
provide, for display, a first graphical window from a sequence of graphical windows,
the first graphical window including a first background color and one or more first icons;
provide, for display, a color input mechanism;
receive a user input based on a selection of a particular portion of the color input mechanism;
determine that the particular portion of the color input mechanism matches a second background color,
automatically navigate, based on the user input, from the first graphical window to a second graphical window, from the sequence of graphical windows, that includes the second background color and one or more second icons; and provide, during navigating from the first graphical window to the second graphical window, information regarding the second background color to indicate a transition from the first graphical window to the second graphical window.

24. The non-transitory computer-readable medium of claim 23, where the one or more first icons correspond to a first type of files, where the one or more second icons correspond to a second type of files, and where the first type of files is different from the second type of files.

25. The non-transitory computer-readable medium of claim 23, where the color input mechanism includes a color sphere input mechanism, a color wheel input mechanism, or a color spectrum input mechanism.

* * * * *